(12) United States Patent
Rashidy et al.

(10) Patent No.: US 7,243,983 B2
(45) Date of Patent: Jul. 17, 2007

(54) RETRACTABLE PILLAR FOR CONVERTIBLE VEHICLE

(75) Inventors: Mostafa Rashidy, West Bloomfield, MI (US); George Wolenter, Dearborn Heights, MI (US); Robert G. Storc, Rochester Hills, MI (US); Gerald F. Tobin, Grosse Ile, MI (US)

(73) Assignee: ASC Incorporated, Southgate, MI (US)

( * ) Notice: Subject to any disclaimer, the term of this patent is extended or adjusted under 35 U.S.C. 154(b) by 0 days.

(21) Appl. No.: 11/064,030

(22) Filed: Feb. 23, 2005

(65) Prior Publication Data

US 2006/0186705 A1    Aug. 24, 2006

(51) Int. Cl.
    B62D 25/02    (2006.01)
(52) U.S. Cl. .................. 296/193.06; 296/107.09; 296/201
(58) Field of Classification Search ........... 296/107.09, 296/116, 117, 201, 202, 107.19, 107.2, 193.06
    See application file for complete search history.

(56) References Cited

U.S. PATENT DOCUMENTS

| | | | |
|---|---|---|---|
| 1,199,497 A | 9/1916 | Richards | |
| 1,353,157 A | 9/1920 | Freeman | |
| 1,463,193 A * | 7/1923 | Botella | 296/116 |
| 1,720,953 A | 7/1929 | Geyer | |
| 1,956,616 A | 5/1934 | Holtom | |
| 2,079,232 A * | 5/1937 | Smith | 296/116 |
| 3,198,572 A | 8/1965 | Stolarczyk | |
| 3,292,726 A | 12/1966 | Jette, Jr. | |
| 3,298,731 A | 1/1967 | Sangimino | |
| 3,492,044 A | 1/1970 | Mycroft | |
| 3,666,313 A | 5/1972 | Halstead et al. | |
| 4,089,542 A | 5/1978 | Westerman | |
| 4,202,565 A | 5/1980 | Mosch | |
| 4,229,036 A | 10/1980 | Toda | |
| 4,348,046 A | 9/1982 | Ohya | |
| 4,514,891 A | 5/1985 | Draper | |
| 4,557,502 A | 12/1985 | Scaduto et al. | |
| 4,591,204 A | 5/1986 | Gallitzendoerfer et al. | |
| 4,626,026 A | 12/1986 | Hasegawa | |
| 4,671,559 A * | 6/1987 | Kolb | 296/107.09 |
| 4,695,089 A | 9/1987 | Fukutomi et al. | |
| 4,700,982 A | 10/1987 | Kuraoka et al. | |
| 4,708,389 A | 11/1987 | Maebayashi et al. | |
| 4,711,485 A | 12/1987 | Maebayashi et al. | |
| 4,828,317 A * | 5/1989 | Muscat | 296/122 |
| 4,932,712 A | 6/1990 | Tomforde | |
| 4,993,775 A | 2/1991 | Keys | |
| 5,092,078 A | 3/1992 | Keys | |

(Continued)

FOREIGN PATENT DOCUMENTS

DE    4241054    * 11/1993

(Continued)

Primary Examiner—Dennis H. Pedder
(74) Attorney, Agent, or Firm—Harness, Dickey & Pierce, P.L.C.

(57) ABSTRACT

A retractable pillar is used in a convertible vehicle. In another aspect of the present invention, a pillar is automatically retracted and extended. A further aspect of the present invention rotates at least a portion of the pillar during its movement. In still another aspect of the present invention, a retractable B-pillar provides weatherstrip sealing to a door-mounted window.

40 Claims, 23 Drawing Sheets

U.S. PATENT DOCUMENTS

| | | |
|---|---|---|
| 5,224,735 A | 7/1993 | Jambor et al. |
| 5,236,219 A | 8/1993 | Jambor et al. |
| 5,284,360 A | 2/1994 | Busch et al. |
| 5,356,194 A | 10/1994 | Takeuchi |
| 5,456,516 A * | 10/1995 | Alexander et al. ..... 296/146.14 |
| 5,475,956 A | 12/1995 | Agrawal et al. |
| 5,588,694 A | 12/1996 | Koehr |
| 5,779,299 A | 7/1998 | Purcell et al. |
| 5,806,914 A | 9/1998 | Okada |
| 5,913,762 A | 6/1999 | Matsumoto |
| 6,086,138 A | 7/2000 | Xu et al. |
| 6,114,819 A * | 9/2000 | Porter et al. ................ 318/466 |
| 6,135,535 A | 10/2000 | Tarahomi |
| 6,305,736 B1 | 10/2001 | Enomoto et al. |
| 6,438,843 B1 | 8/2002 | Tarahomi |
| 6,481,772 B1 | 11/2002 | Tenn |
| 6,517,135 B2 | 2/2003 | de Gaillard |
| 6,550,842 B1 * | 4/2003 | Halbweiss et al. .......... 296/116 |
| 6,575,521 B2 | 6/2003 | Tarahomi |
| 6,755,457 B2 | 6/2004 | Grubbs |
| 6,843,522 B2 * | 1/2005 | Lange ................... 296/107.09 |
| 6,851,743 B2 * | 2/2005 | George et al. .............. 296/202 |
| 2003/0011208 A1 * | 1/2003 | Tamura et al. .............. 296/108 |
| 2004/0032146 A1 | 2/2004 | Plesternings |
| 2005/0194811 A1 * | 9/2005 | Fischer ....................... 296/108 |

FOREIGN PATENT DOCUMENTS

| | | | | |
|---|---|---|---|---|
| FR | 459931 | * | 11/1913 | ................. 296/116 |
| FR | 671743 | | 9/1929 | |
| FR | 671743 | * | 12/1929 | ........... 296/107.09 |
| GB | 273894 | * | 7/1927 | ........... 296/107.19 |
| GB | 612015 | * | 11/1948 | ................. 296/117 |

* cited by examiner

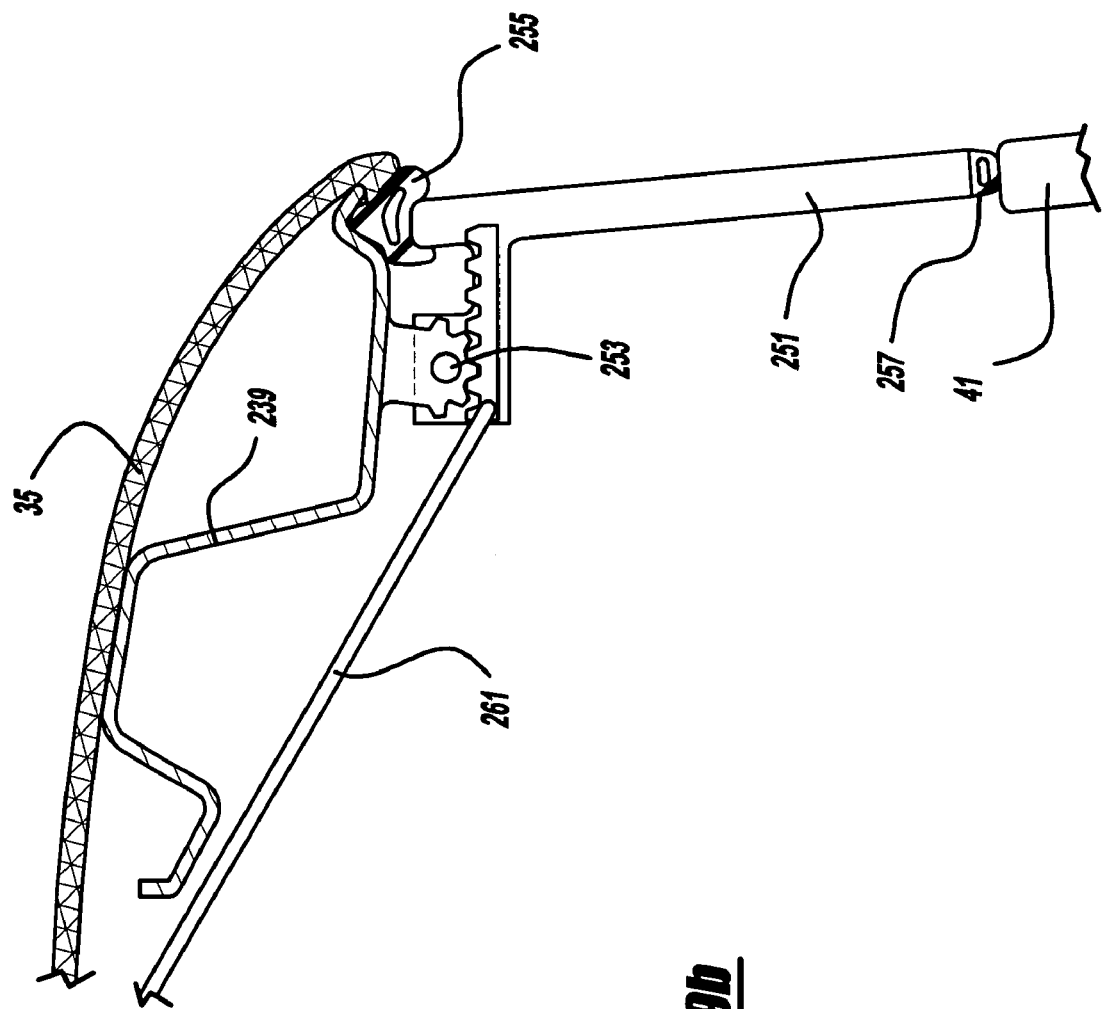
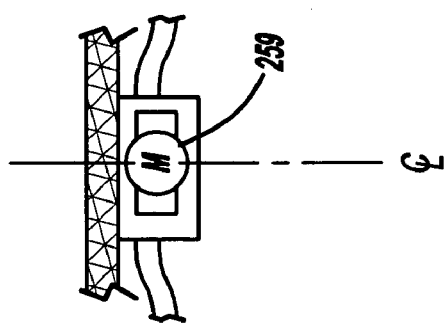
FIG-19b

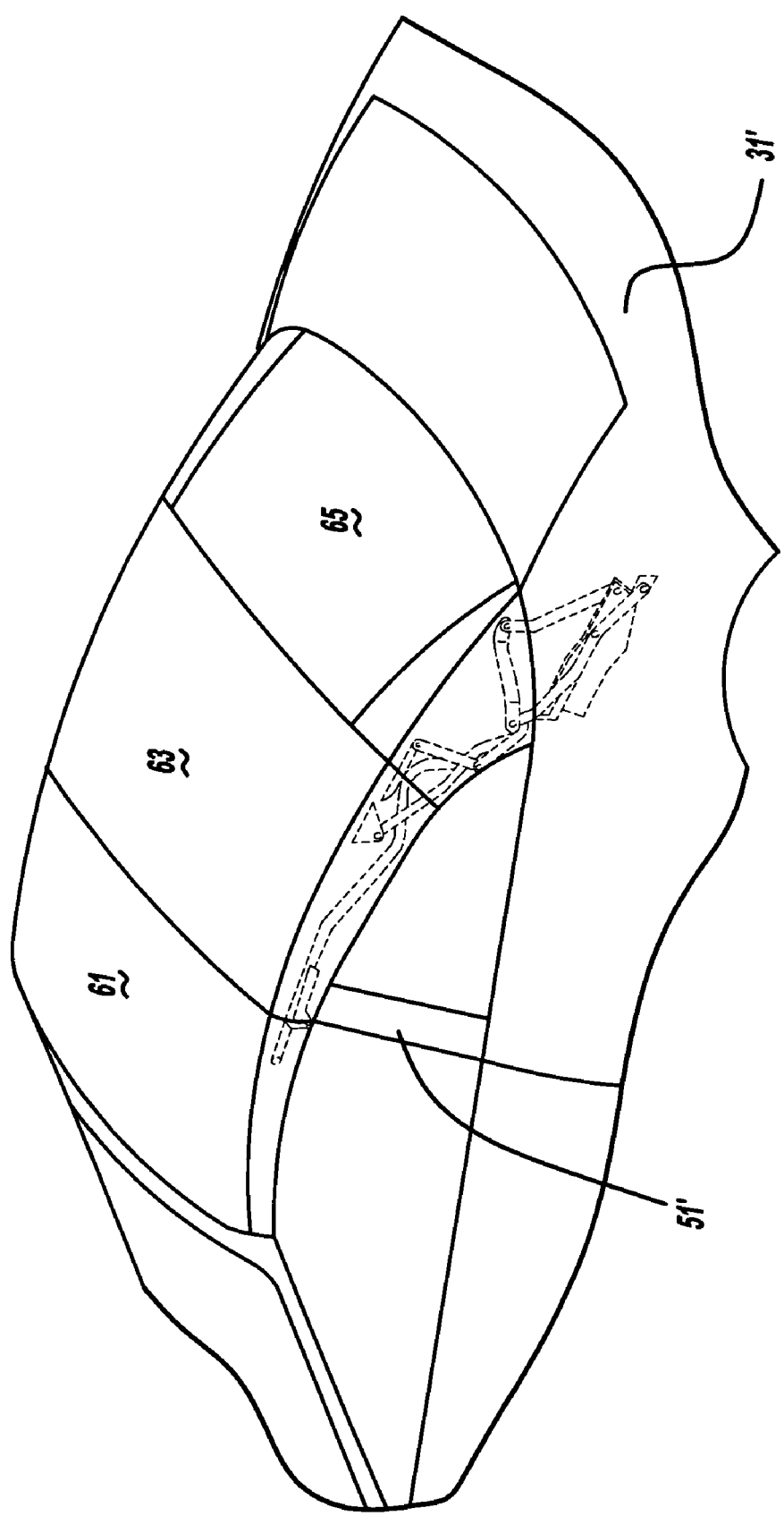

US 7,243,983 B2

RETRACTABLE PILLAR FOR CONVERTIBLE VEHICLE

BACKGROUND AND SUMMARY OF THE INVENTION

The present invention relates generally to automotive vehicles and more particularly to a retractable pillar for a convertible vehicle.

It is known to provide soft-top and hard-top convertible roofs for automotive vehicles. For example, U.S. Pat. No. 6,695,385 entitled "Vehicle Convertible Roof" which issued to Lang on Feb. 24, 2004, and the utility conversion U.S. Ser. No. 11/035,318 filed Jan. 13, 2005, based on U.S. patent application Ser. No. 60/612,384 entitled "In-Folding Convertible Roof" which was invented by Dilluvio and filed on Sep. 23, 2004, disclose soft-top roofs with side rails. U.S. Pat. No. 6,695,386 entitled "Vehicle Retractable Hardtop Roof," which issued to Willard on Feb. 24, 2004, and U.S. Pat. No. 5,743,587 entitled "Apparatus for Use in an Automotive Vehicle having a Convertible Roof System," which issued to Alexander, et al. on Apr. 28, 1998, disclose hard-top roofs with integral side rails. These patents are all incorporated by reference herein.

Weatherstrip sealing between adjacent, movable side windows is often complicated and difficult to achieve in convertible vehicles. This is especially difficult in the limited attempts to provide a four door convertible vehicle. Most four door convertible vehicles are generally considered to lack satisfactory body stiffness and are inadequate to meet the stringent side impact requirements under the new U.S. Federal Motor Vehicle Safety Standard ("FMVSS") 214. One prior attempt to employ a four door movable roof is described in U.S. Pat. No. 3,298,731 entitled "Multi-Purpose Vehicle" which issued to Sangimino on Jan. 17, 1967. This structure discloses manually retractable posts against which can be folded side rail bars used to guide a roll up roof cover. Thus, the need still remains to provide a satisfactory window sealing structure that is easily retracted when a convertible roof is retracted, and without detracting from the structural integrity and stiffness of the vehicle body.

In accordance with the present invention, a retractable pillar is used in a convertible vehicle. In another aspect of the present invention, a pillar is automatically retracted and extended. A further aspect of the present invention rotates at least a portion of the pillar during its movement. Yet another aspect of the present invention moves an upper pillar segment inboard relative to a stationary lower pillar segment. In still other aspects of the present invention, a retractable B-pillar provides weatherstrip sealing to a door-mounted window, and interfaces with a folding convertible roof. Moreover, an additional aspect of the present invention retracts a side pillar toward a roof.

The retractable pillar of the present invention is advantageous over traditional devices. For example, it is envisioned that improved weatherstrip sealing will occur for both front and rear side windows adjacent the pillar. Moreover, the automated movement of the pillar allows for easy and refined use by the vehicle driver based on single button actuation of the convertible roof. Furthermore, the present invention advantageously provides various optimized packaging scenarios to minimize retracted size but without detracting from vehicle body structure and stiffness. The present invention also enhances the aesthetic appearance of a pillar system when the convertible roof is raised and lowered. Additional advantages and features of the present invention will become apparent from the following description and appended claims, taken in conjunction with the accompanying drawings.

BRIEF DESCRIPTION OF THE DRAWINGS

FIGS. 19*a-c* are cross-sectional views showing variations of a fourth alternate embodiment retractable pillar, in an extended position; and FIG. 20 is a perspective view showing the first preferred embodiment pillar used in a hard top roof system.

DETAILED DESCRIPTION OF THE PREFERRED EMBODIMENTS

Figure 1:
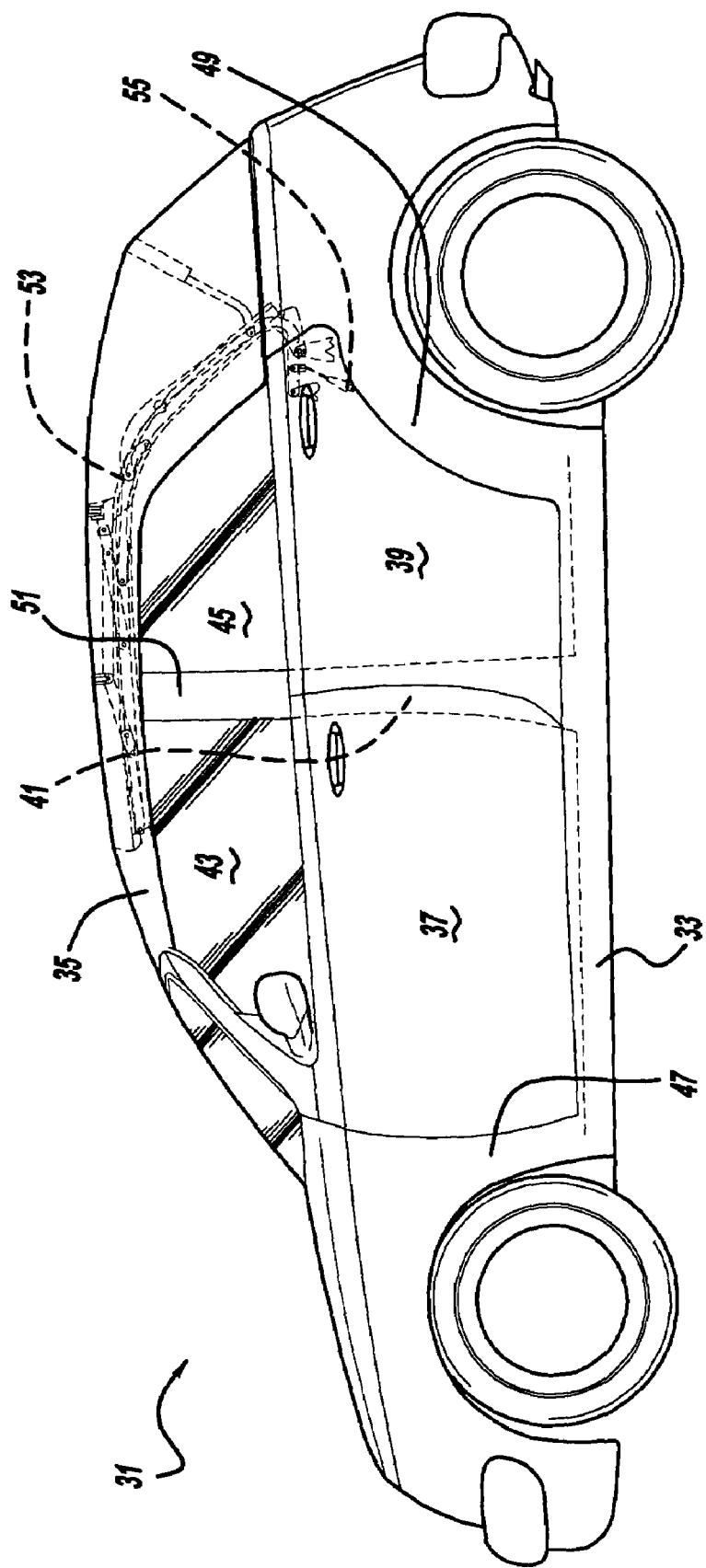
FIGS. 1-4 are side elevational views showing a first preferred embodiment of a retractable pillar and convertible roof of the present invention, in different operating positions.
Figure 2:
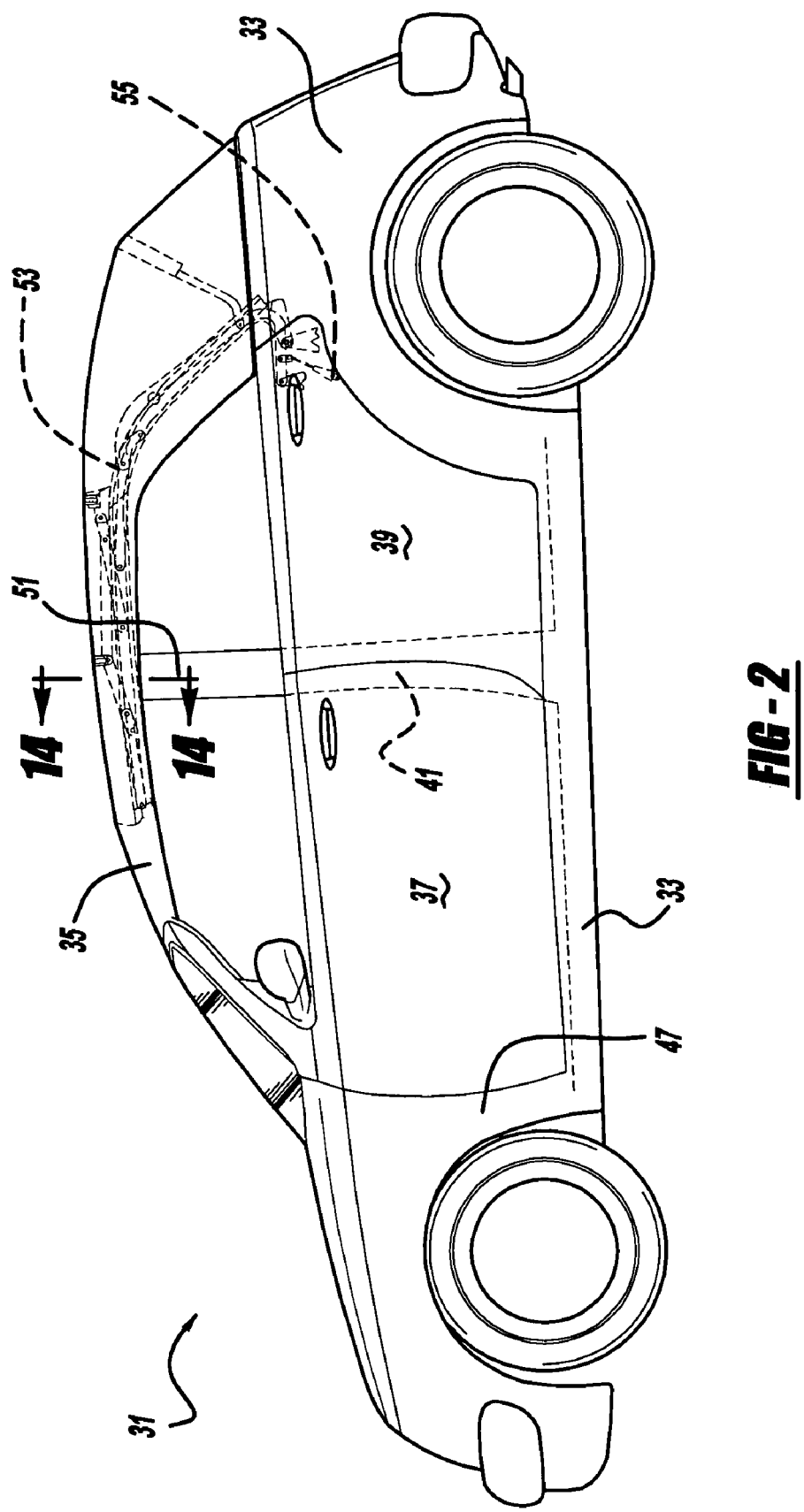

Referring to FIGS. 1-5, a first preferred embodiment of an automotive vehicle 31 of the present invention includes a body 33 and a convertible roof 35. Body 33 includes a pair of front passenger doors 37 and a pair of rear passenger doors 39, separated by a stationary lower, center-pillar or B-pillar 41. A front side window 43 is mounted to each front door 37 and a rear side window 45 is mounted to each rear door 39. An electric motor-driven and scissor arm window lift mechanism, tape drive mechanism, or the like, raises and lowers each side window into its respective door. Each front door 37 pivots open about its hinge which is connected to an A-pillar area 47, adjacent a windshield, and each rear door 39 pivots open about its hinge which is connected to lower B-pillar 41. A striker and latch assembly retains each front door 37 to lower B-pillar 41, when closed, and a striker and latch assembly retains each rear door to a C-pillar area 49, when closed. A retractable upper B-pillar 51 is coupled to each lower B-pillar 41 and is disposed between side windows 43 and 45.

Convertible roof 35 is shown as a soft-type variety having a foldable top stack mechanism 53 which supports a pliable fabric cover. An automatic actuator 55, such as a hydraulic cylinder or electric motor, drives convertible roof from a raised or closed position (see FIGS. 1 and 2) to a lowered or open position (see FIG. 3). Topstack mechanism 53 includes side rails, roof bows and other linkages as may be necessary for specific vehicle configurations. Alternately, automatically actuated two or three piece folding hard-top roof sections 61, 63 and 65 (see FIG. 20) can be employed, where a vehicular beltline is shown at reference number 67.

Figure 7:
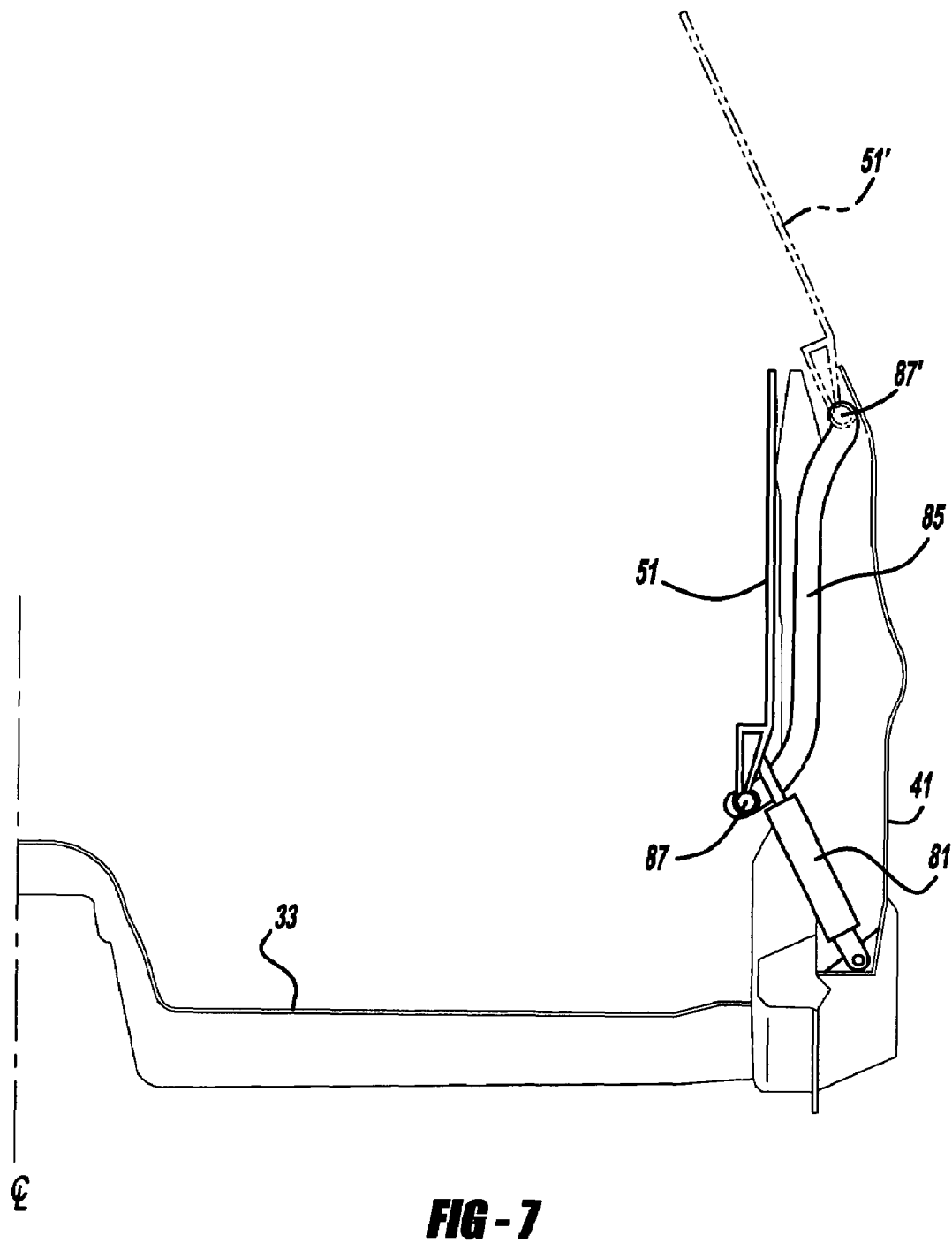
FIG. 7 is a diagrammatic rear view showing the first preferred embodiment pillar, in a retracted position.
Figure 8:
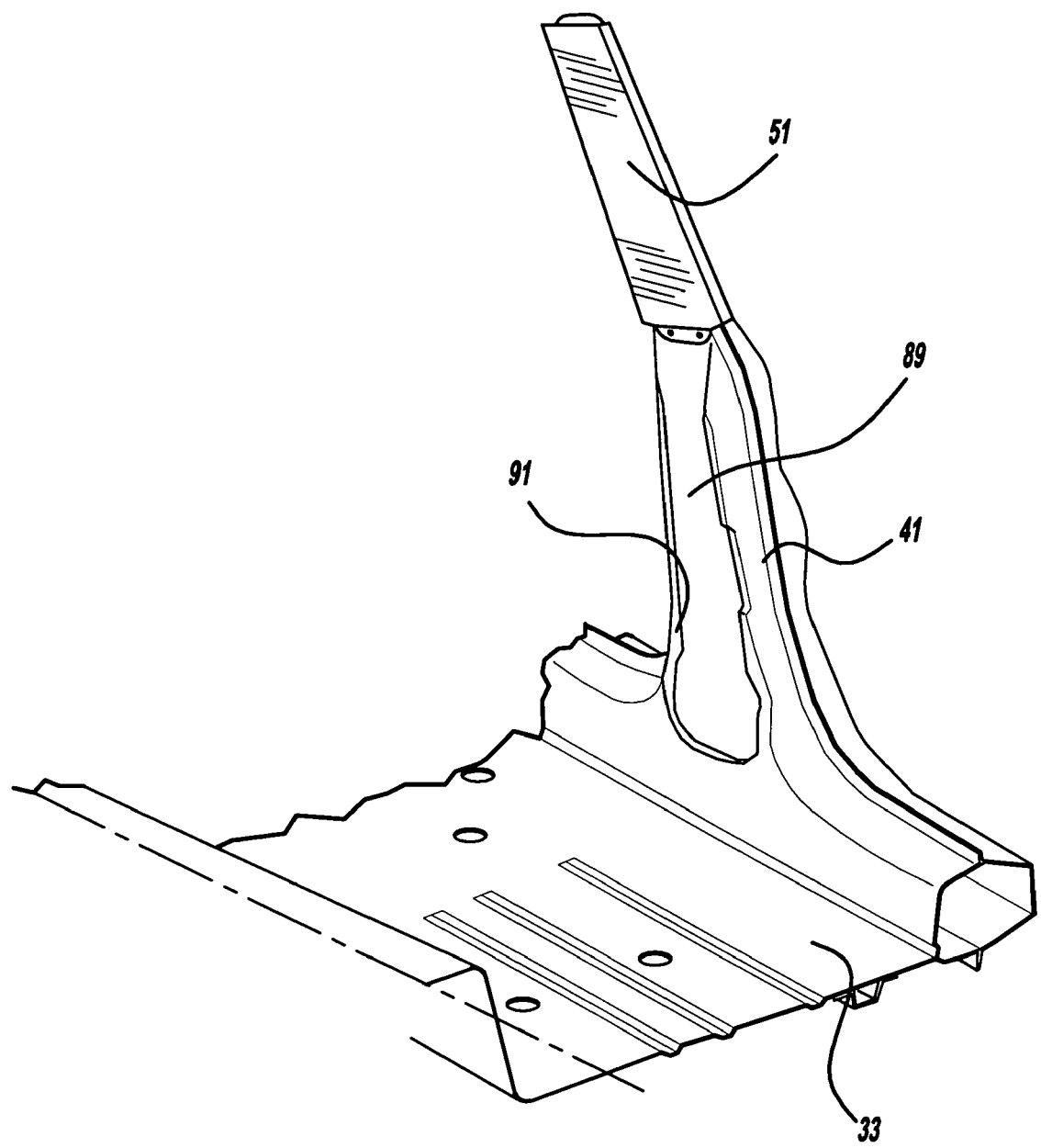
FIG. 8 is a fragmentary and perspective view, from inside the vehicle, showing the first preferred embodiment pillar, in an extended position.
Figure 9:
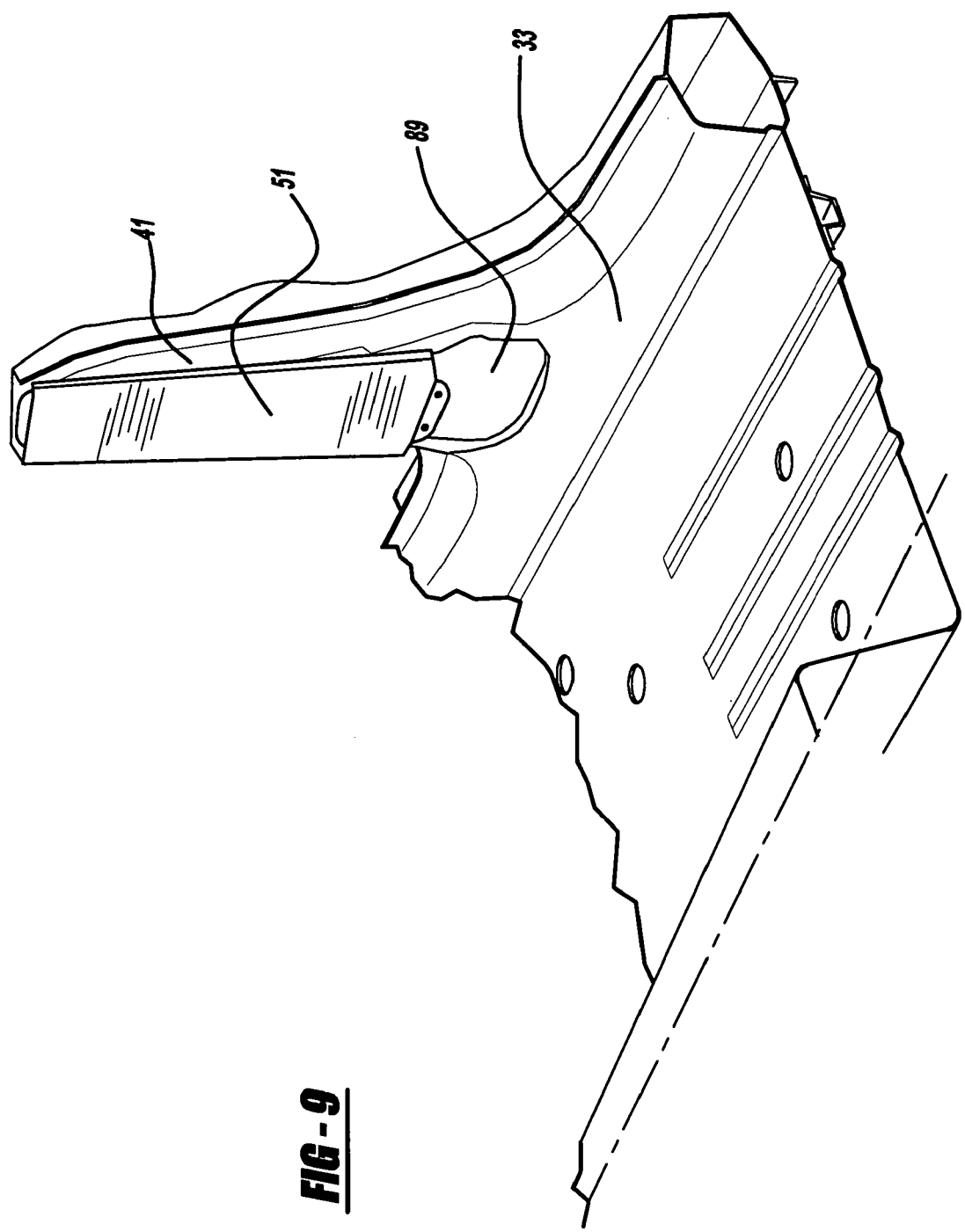
FIG. 9 is a view like that of FIG. 8, showing the first preferred embodiment pillar, in a retracted position.
Figure 12:
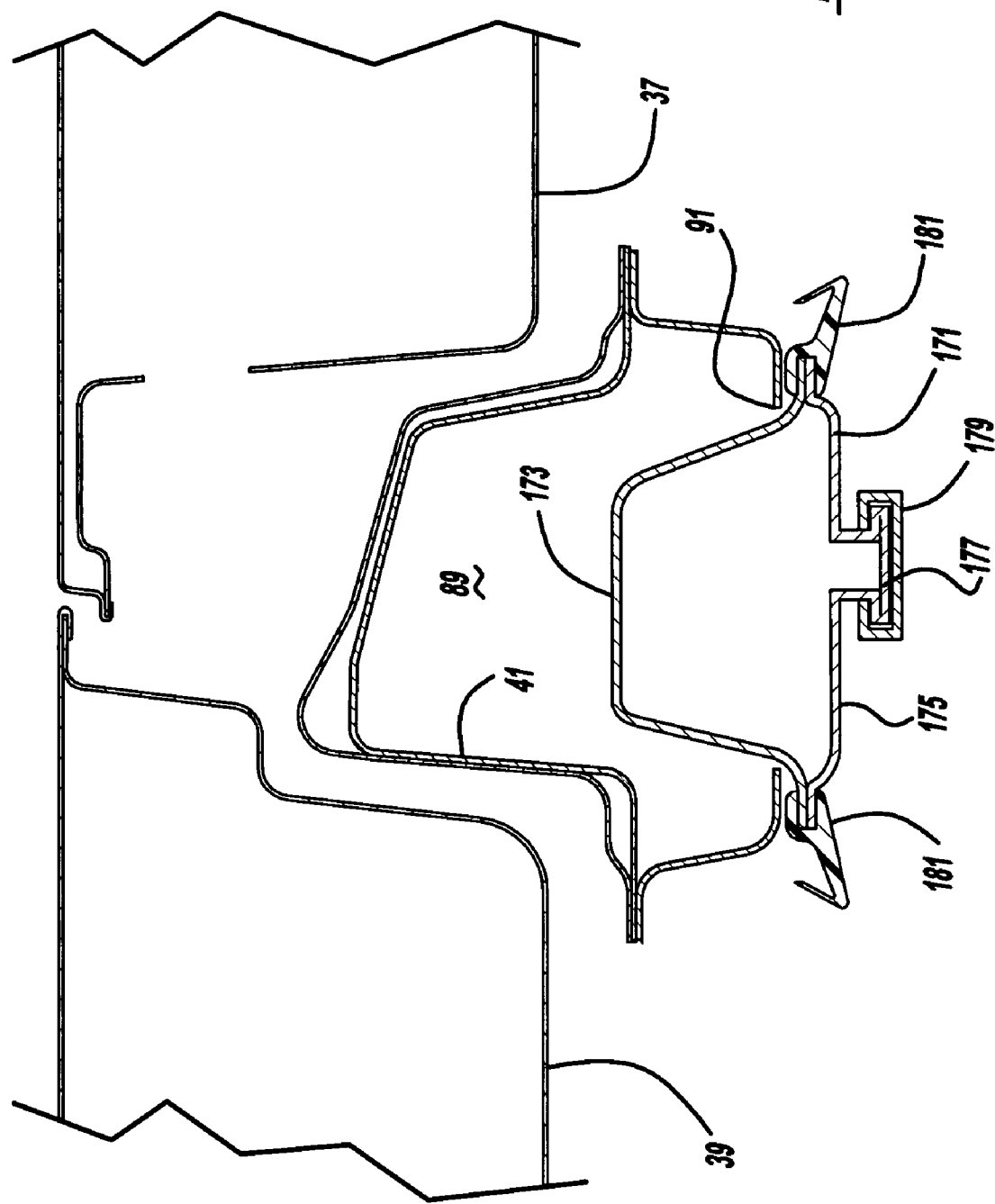
FIGS. 12*a* and *b* are cross-sectional views, similar to that of FIG. 11, showing variations of a third preferred embodiment retractable pillar, in a retracted position.

Upper B-pillar 51 is automatically moved from the extended or advanced position, shown in FIGS. 1-3, 5 and 8, to a retracted or hidden position, shown in FIGS. 4, 6, 7 and 9, by use of a hydraulic actuator employing a fluid cylinder 81 and rod 83 (see FIG. 6) and a vertically elongated guide channel 85 (see FIG. 7). Alternately, the actuator can be pneumatically or electromagnetically powered. Guide channel 85 has offset upper and lower sections, in a cross-vehicle direction, which serve to cam one or more follower rollers 87 in the cross-vehicle direction during extending and retracting movement. Thus, outer surfaces of upper and lower B-pillars 51 and 41, respectively, are essentially flush and in a vertically stacked orientation one above the other, when in the extended position. In contrast, upper B-pillar 51 is inwardly moved, without encroaching on the necessary, impact-resistant structure of lower B-pillar 41, when fully retracted; hence, the B-pillar sections are in a generally overlapping and parallel orientation when upper B-pillar 51 is fully retracted. Also, cylinder 81 and guide channel 85 are at least partially positioned within a hollow area 89 (see FIGS. 8 and 12) between inner and outer sheet metal panels defining B-pillar lower 41. An opening 91 in the inner panel allows access to hollow area 89. A vertically elongated, tubular reinforcement may optionally be welded within hollow area 89 to add structural reinforcement against side impact collisions, and for door hinge and striker stability. Moreover, a cross-beam structure can be secured to each lower B-pillar below or otherwise adjacent but clear of the retracted upper B-pillar. Such a cross-beam structure is disclosed in U.S. patent application Ser. No. 10/979,873 entitled "Structural System for a Convertible Automotive Vehicle" which was invented by Rashidy et al. and filed on Nov. 2, 2004; this application is incorporated by reference herein.

Figure 3:
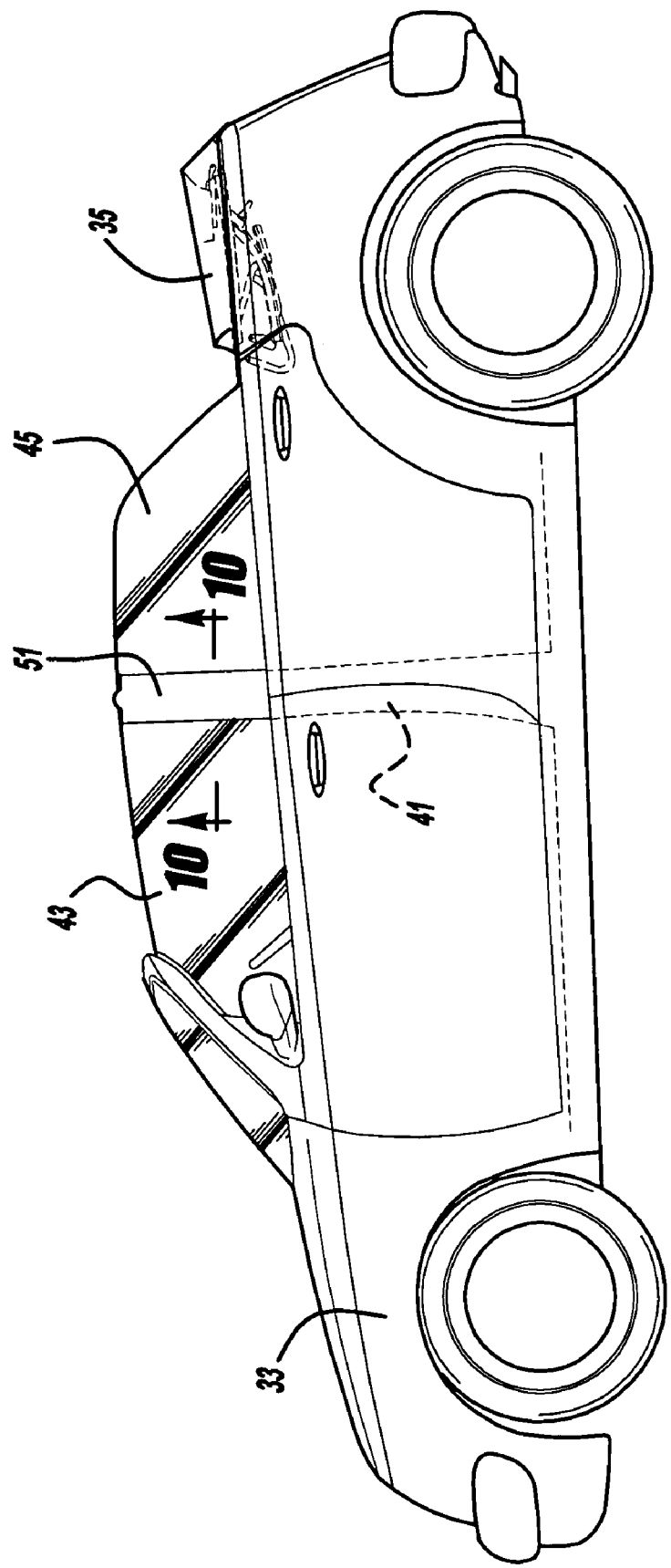
Figure 4:
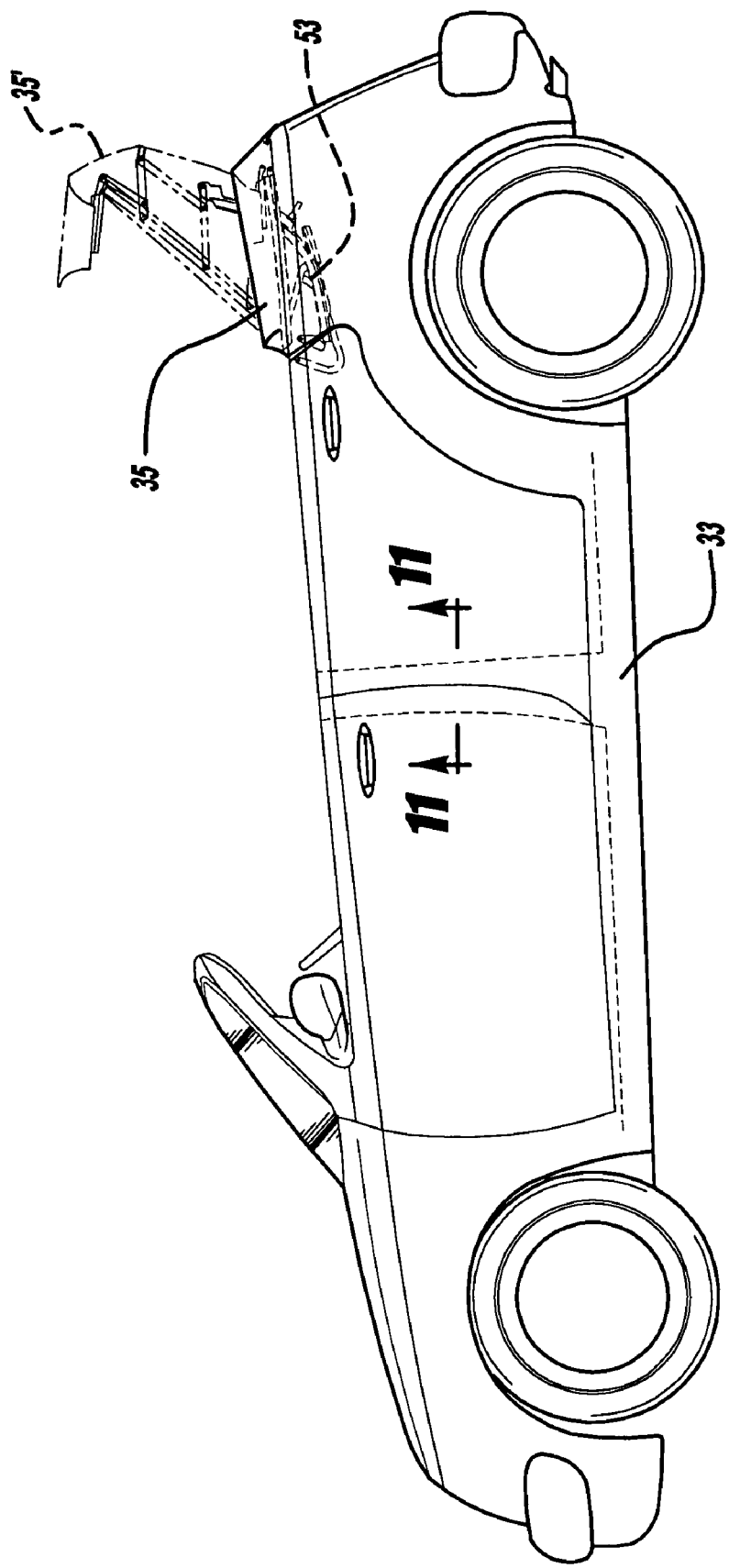
Figure 5:
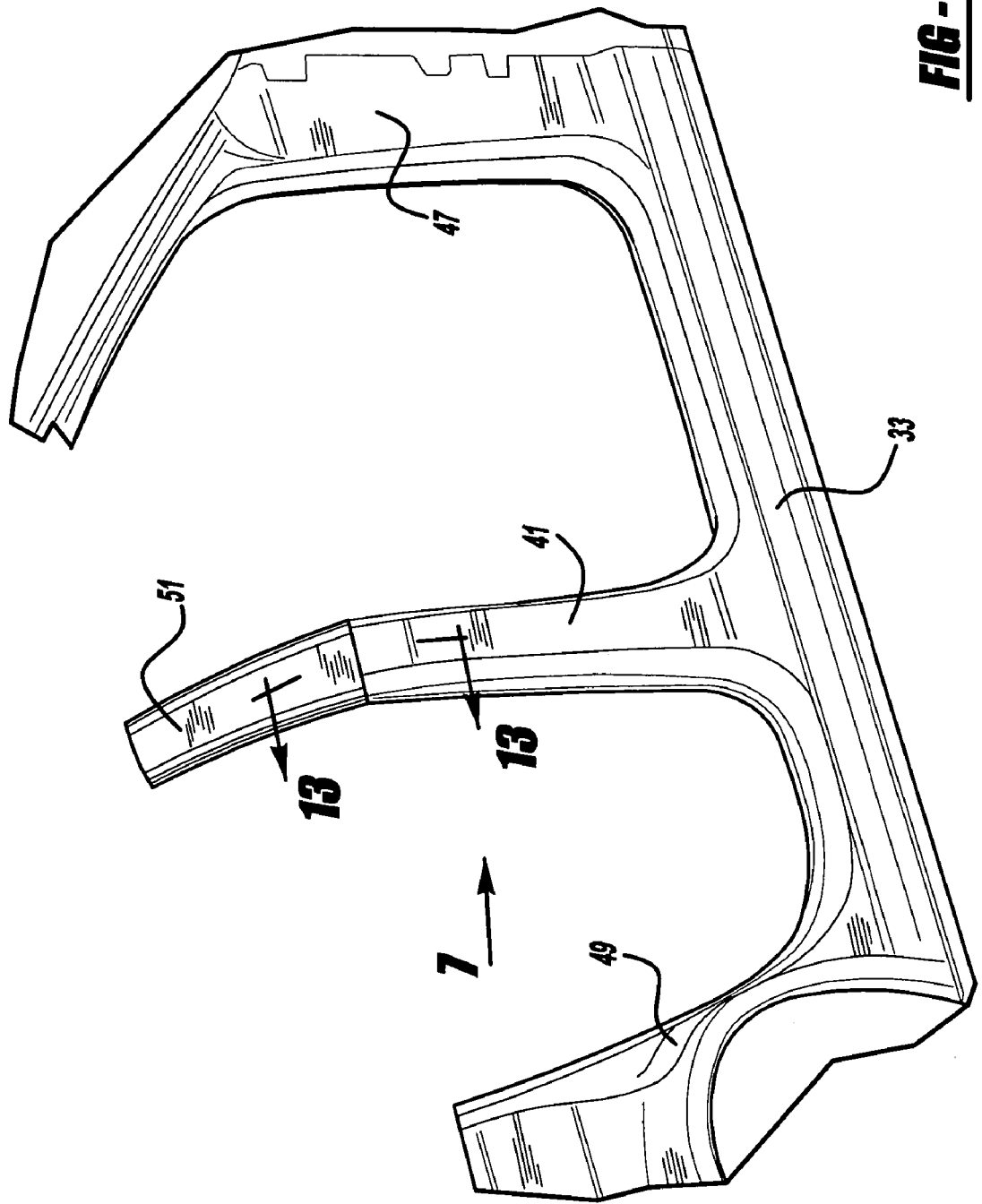
FIG. 5 is a fragmentary and perspective view, from outside the vehicle, showing the first preferred embodiment pillar, in an extended position.
Figure 6:
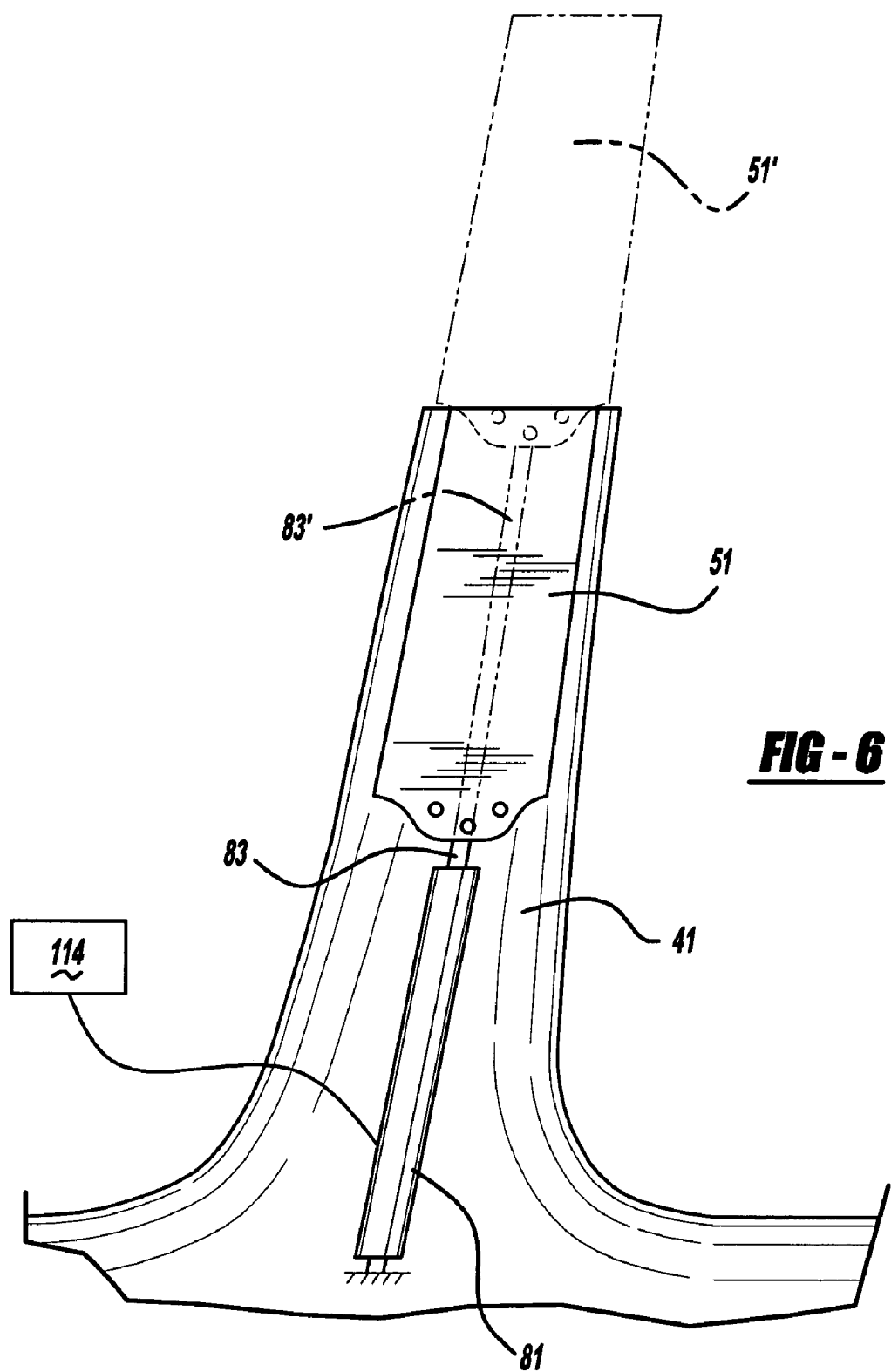
FIG. 6 is a diagrammatic side view showing the first preferred embodiment pillar, in a retracted position.
Figure 10:
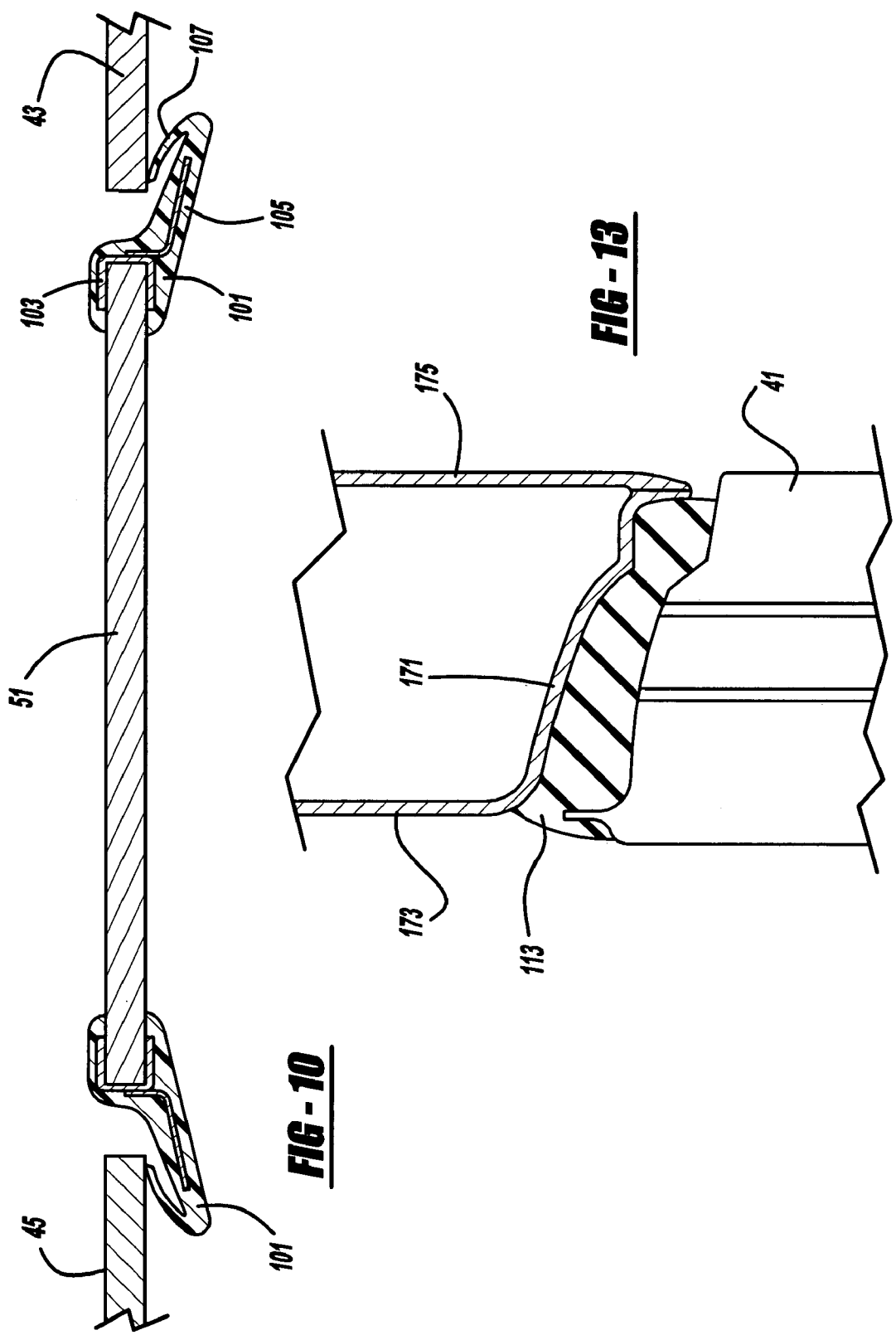
FIG. 10 is a cross-sectional view, taken along line 11-11 of FIG. 3, showing the first preferred embodiment pillar, in the extended position.
Figure 13:
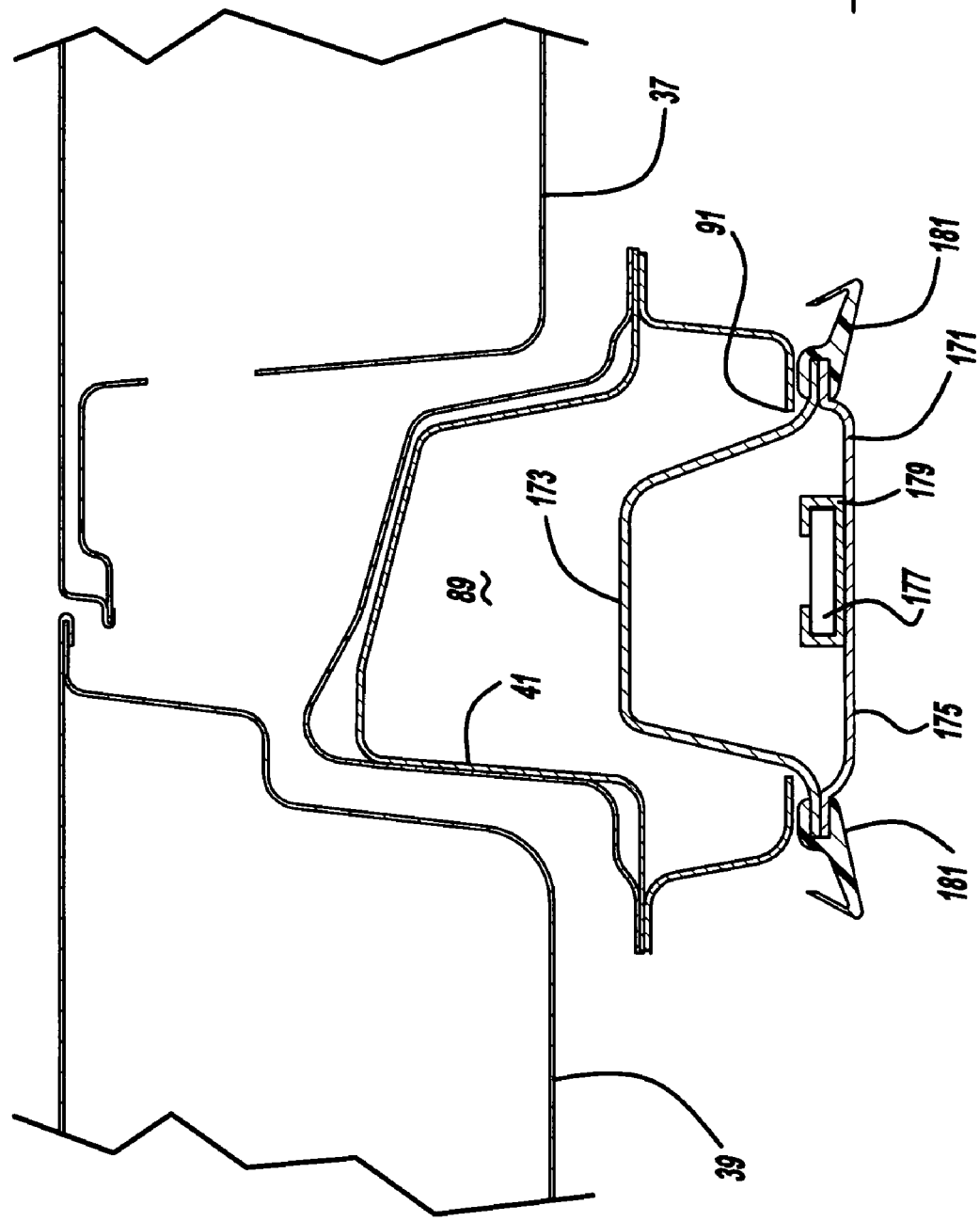
FIG. 13 is a cross-sectional view, taken along line 13-13 of FIG. 5, showing the third preferred embodiment pillar, in an extended position.
Figure 14:
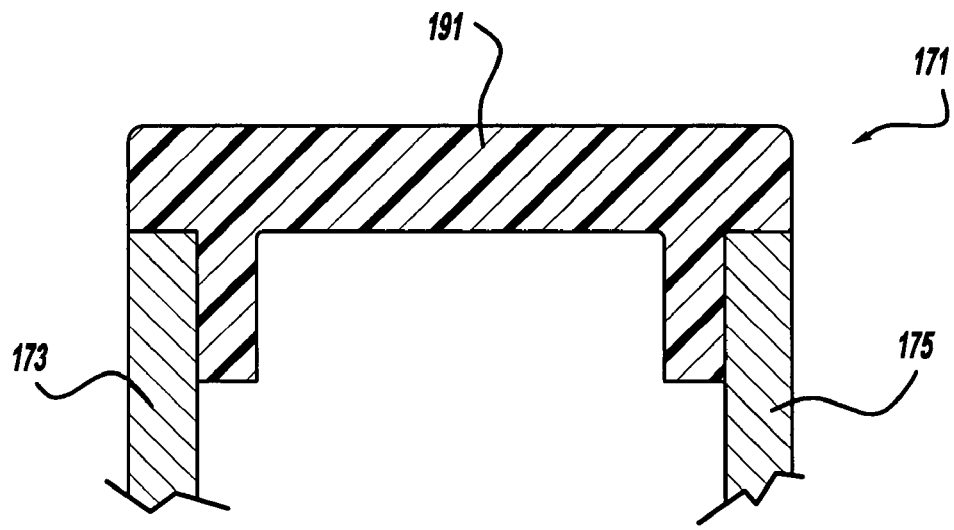
FIG. 14 is a cross-sectional view, taken along line 14-14 of FIG. 2, showing the third preferred embodiment pillar.

FIGS. 1, 3 and 10 show the sealing interface between upper B-pillar 51 and the adjacent side windows 43 and 45. In the present first preferred embodiment, the majority of upper B-pillar is a generally flat and single thickness polymeric or metallic panel having a longitudinal or vertical dimension greater than a fore-and-aft dimension, both of which are significantly greater than a cross-vehicle thickness dimension. A weatherstrip 101 is mounted on the forward, rearward, top and bottom edges of upper B-pillar 51 by insert molded encapsulation, adhesive in a secondary assembly operation, or the like. For example, reference should be made to U.S. Pat. No. 5,475,956 entitled "Panel Assembly" which issued to Agrawal et al. on Dec. 19, 1995 and U.S. Pat. No. 6,086,138 entitled "Vehicular Window Assembly" which issued to Xu et al. on Jul. 11, 2000; both of which are incorporated by reference herein. Each weatherstrip includes a metal insert 103 and a flexible section 105 made of rubber, RIM, or injection molded or extruded PVC. A flexible, wiper-like finger 107 outwardly pushes against an inside surface of the adjacent side window 43 or 45. It should be appreciated that other weatherstrip sealing configurations, such as bulbs 111 (see FIG. 18), solid elastomeric blocks 113 (see FIG. 13) or the like, can be provided at one or more edges of each upper B-pillar.

In operation, the driver pushes an open or close button for the convertible roof. A microprocessor controller 114 receives the button signal and first energizes the motors to lower two or more of the side windows a predetermined distance (see FIG. 2) if they are not in an already lowered condition. Next, the controller subsequently or simultaneously energizes the actuators to retract the upper B-pillars. Either, after window and upper B-pillar retraction, or at least partially simultaneously therewith, the controller energizes any roof latch actuators and then the main roof actuators to cause movement of the convertible roof from its raised position to its retracted position rear of the B-pillar and the passenger compartment seating area (see FIG. 4). The controller will cause reverse operation when desired by the driver. Moreover, the side windows and/or B-pillar upper can be raised (as shown in FIG. 3) after the convertible roof is retracted by occupant use of the appropriate window operation switch.

Figure 11:
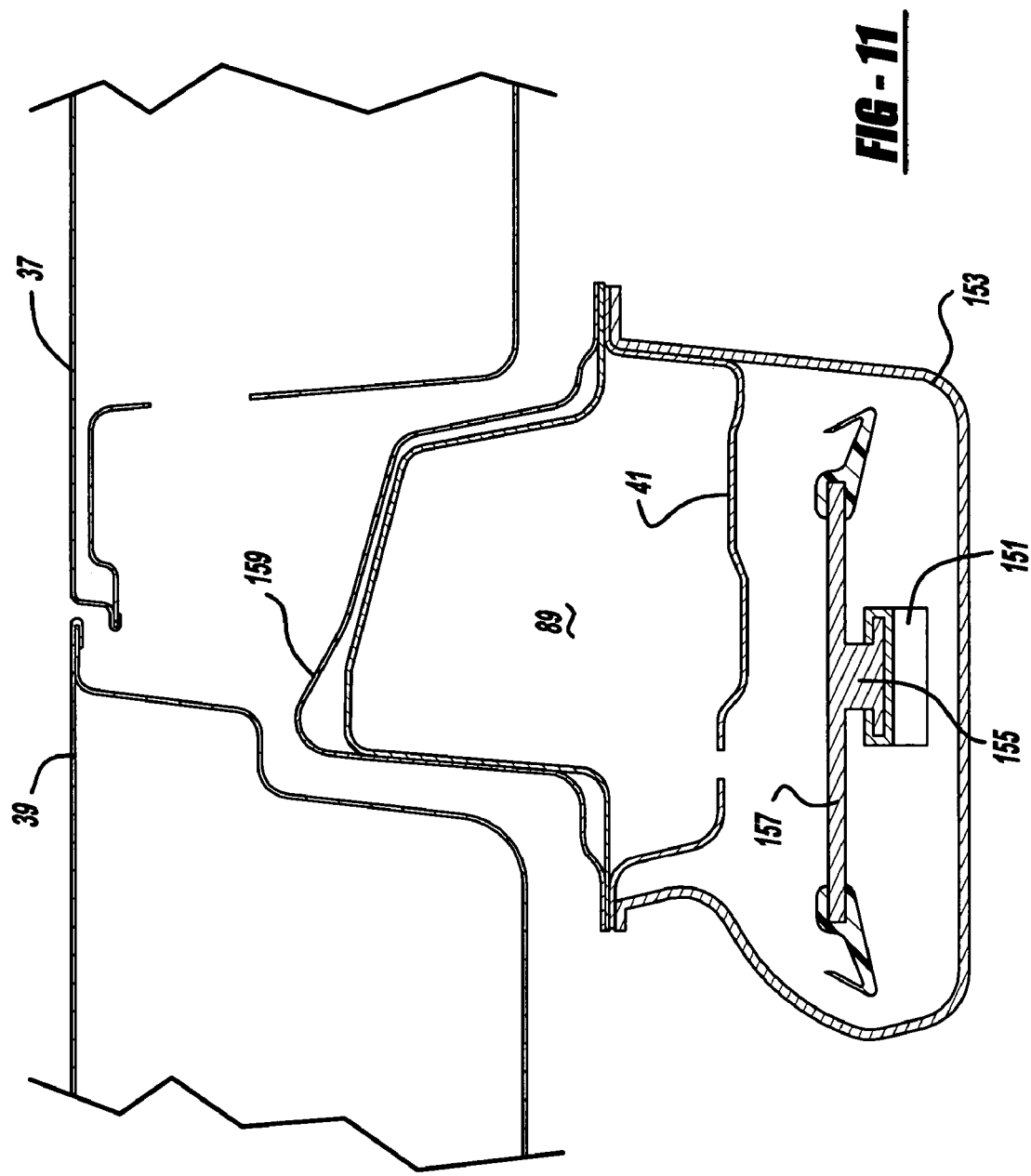
FIG. 11 is a cross-sectional view, taken along line 10-10 of FIG. 6, showing a second preferred embodiment retractable pillar, in a retracted position.

FIG. 11 illustrates a second preferred embodiment wherein a C-cross-sectionally shaped and vertically elongated guide channel 151 is mounted to a polymeric interior trim panel 153 or a lower section of a lower B-pillar 41. One or more T-shaped shoes 155 inwardly projecting from a retractable, upper B-pillar 157 and slidably engage within guide channel 151. An actuator automatically drives upper B-pillar 153. Furthermore, weatherstrips are attached to the edges of upper B-pillar 175. A polymeric, exterior trim panel 159 is also shown attached to the stationary, lower B-pillar 41.

A third preferred embodiment can be observed in FIGS. 12a, 12b, 13 and 14. A retracted, upper B-pillar 171 employs an outer panel 173 and an inner panel 175 which are joined at peripheral fore-and-aft flanges. Referring to FIG. 12a, a shoe formation 177 is either integrally molded or stamped as part of an exterior surface of inner panel 171, or are separately created and then secured together. Shoe formation 177 slides up and down guide channel 179 affixed to a stationary member, such as lower B-pillar 41, an interior trim panel or another body panel. Another variation places shoe formation 177 and guide channel 179 internal to upper B-pillar 171, as can be observed in FIG. 12b. Weatherstrips 181 are attached to and move with upper B-pillar 171. The upper B-pillar creates a hollow box section that adds structural rigidity and thickness. A majority of outer panel 173 of the upper B-pillar is retracted within hollow area 89 of lower B-pillar 41 to minimize retracted packaging space. A polymeric cap 191 is snap-fit or otherwise attached to an upper edge of upper B-pillar 171. A weatherstrip may be optionally mounted to cap 191.

Figure 15A:
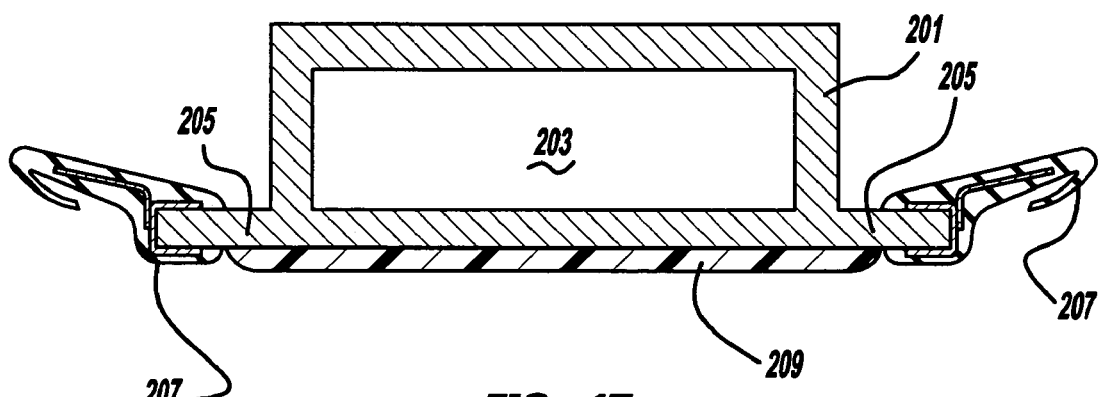
FIGS. 15*a-d* are cross-sectional views, like that of FIG. 10, showing variations of a fourth preferred embodiment retractable pillar.
Figure 15B:
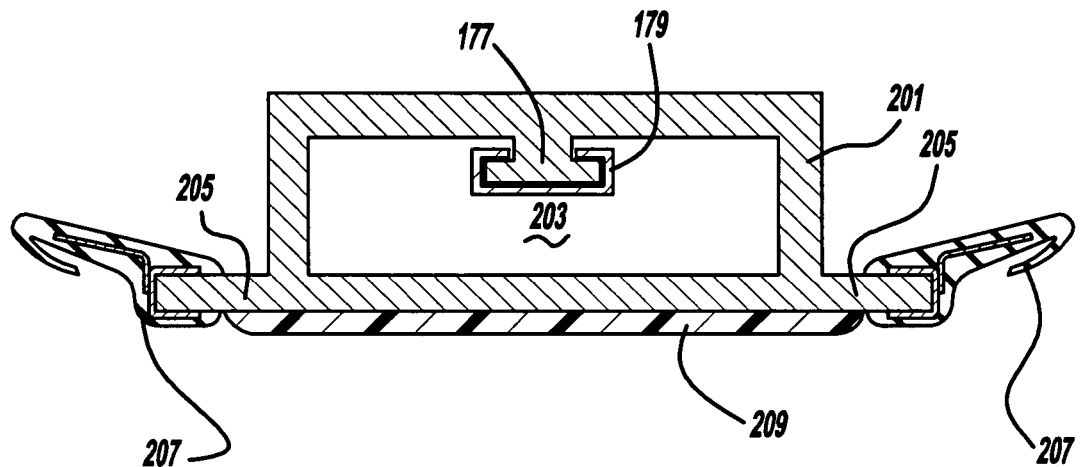
Figure 15C:
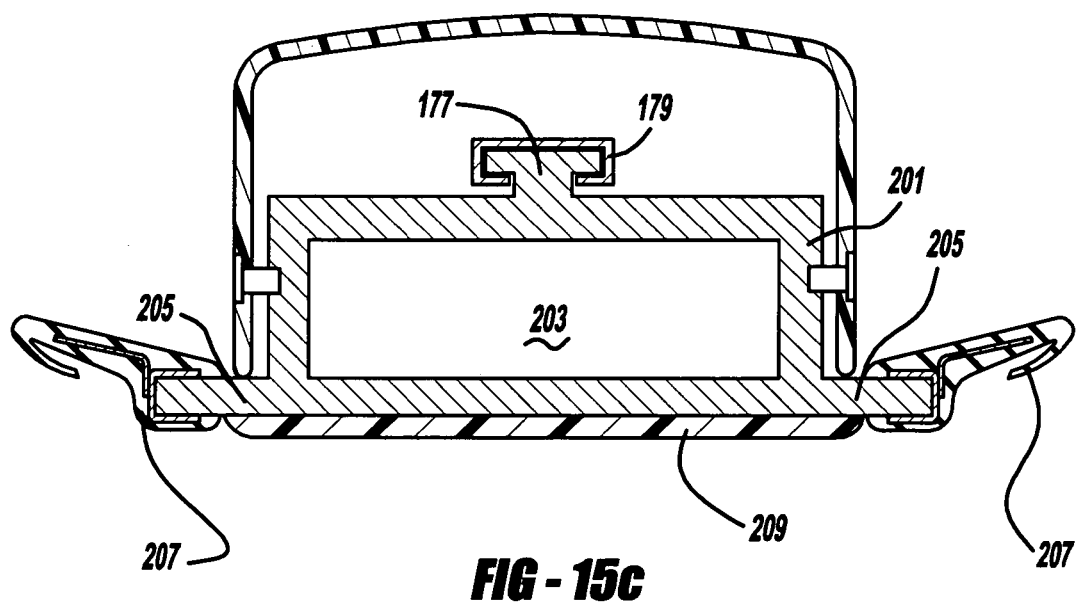
Figure 15D:
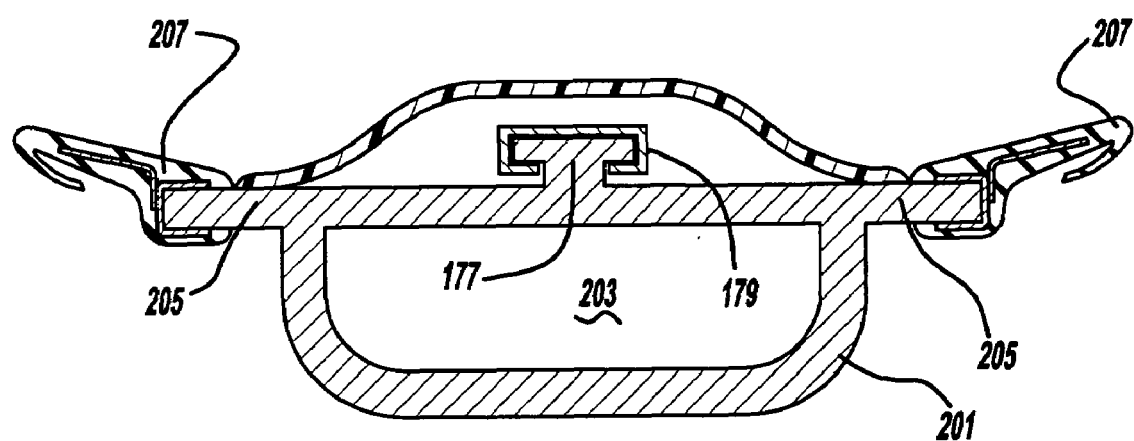

Variations of a fourth preferred embodiment are shown in FIGS. 15a-15d. A retractable upper B-pillar 201 is extruded from aluminum or a polymeric material, and includes a hollow box section 203 and peripheral fore-and-aft flanges 205. A weatherstrip 207 is mounted on each flange and a polymeric, exterior trim panel 209 is optionally mounted on an outside appearance surface of upper B-pillar 201. A rigid polymeric or flexible vinyl covering (see FIGS. 15c and 15d) can also be attached to act as an interior trim panel for upper B-pillar 201. FIG. 15b illustrates a shoe formation 177 and guide channel 179 internal to upper B-pillar 201, FIG. 15c shows them on an in-board facing external surface of upper B-pillar 201, while FIG. 15d reverses the positioning of the upper B-pillar and its interior trim mounting.

Figure 16:
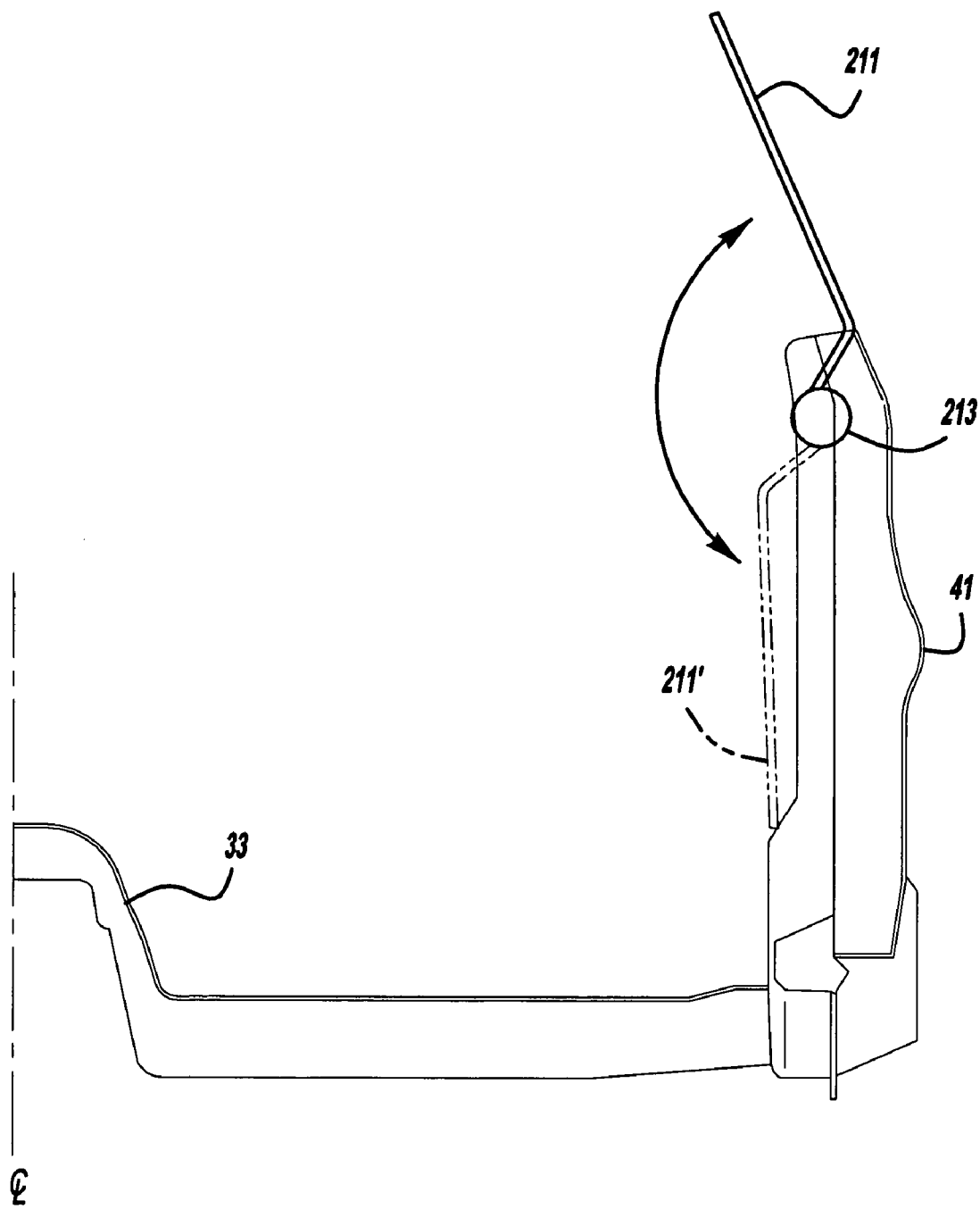
FIG. 16 is a view, like that of FIG. 7, showing a first alternate embodiment retractable pillar, in an extended position.

Referring to FIG. 16, a first alternate embodiment of the present invention employs an upper B-pillar 211 that automatically retracts by rotating about a pivot adjacent a top section of stationary, lower B-pillar 41. An electric motor or other automatic actuator 213 drives upper B-pillar 211 through gears or the like.

Figure 17:
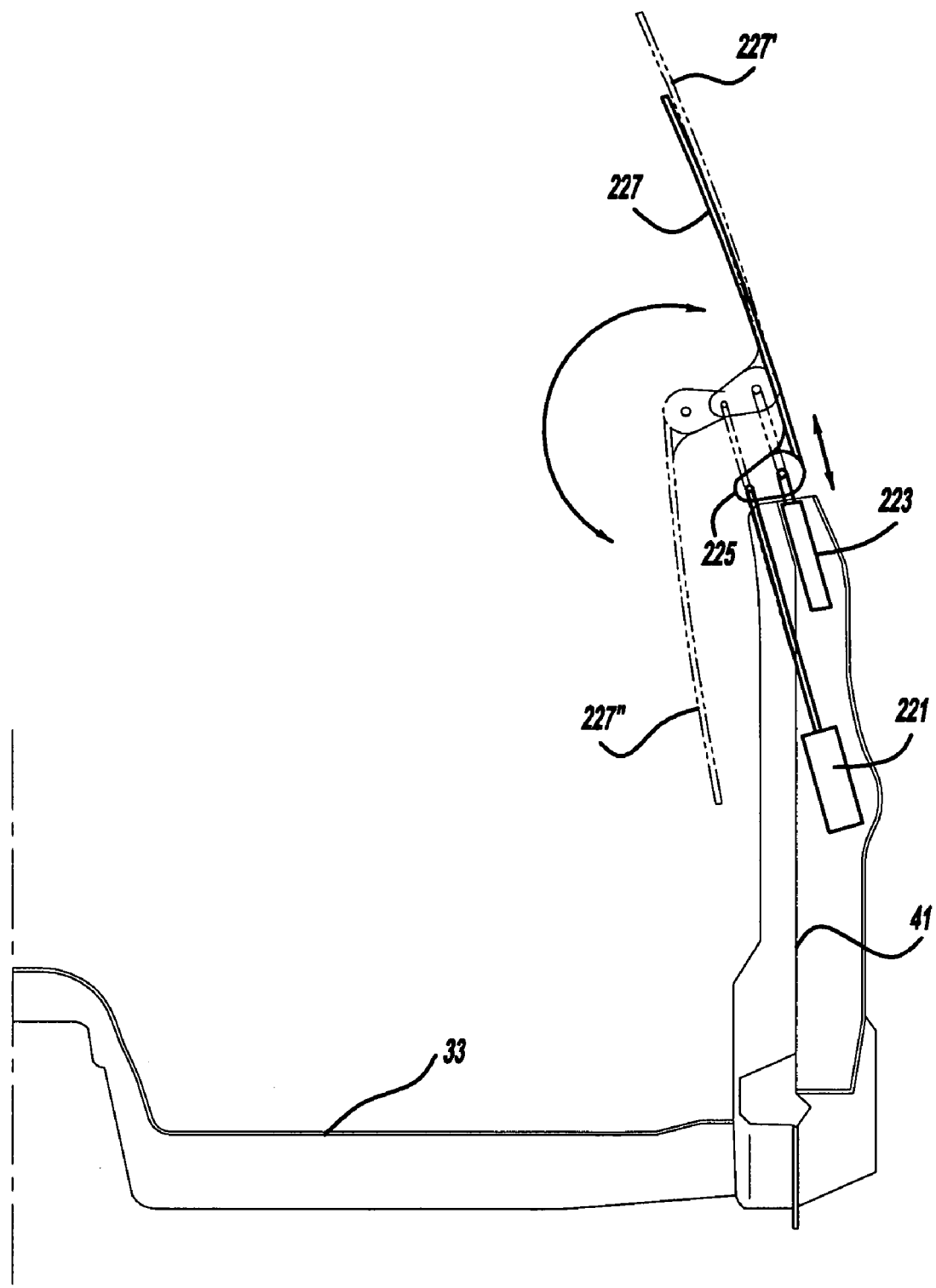
FIG. 17 is a view, like that of FIG. 7, showing a second alternate embodiment retractable pillar, in an extended position.

FIG. 17 illustrates a second alternate embodiment wherein a pair of fluid powered or solenoid actuators 221 and 223 automatically cause linear and rotary motion of a crank 225 and an attached, retractable upper B-pillar 227. The initial, upward linear motion allows upper B-pillar 227 to fully clear the adjacent section of lower B-pillar 41, weatherstrips and any other obstructions prior to rotation and the final, downward linear motion.

Figure 18:
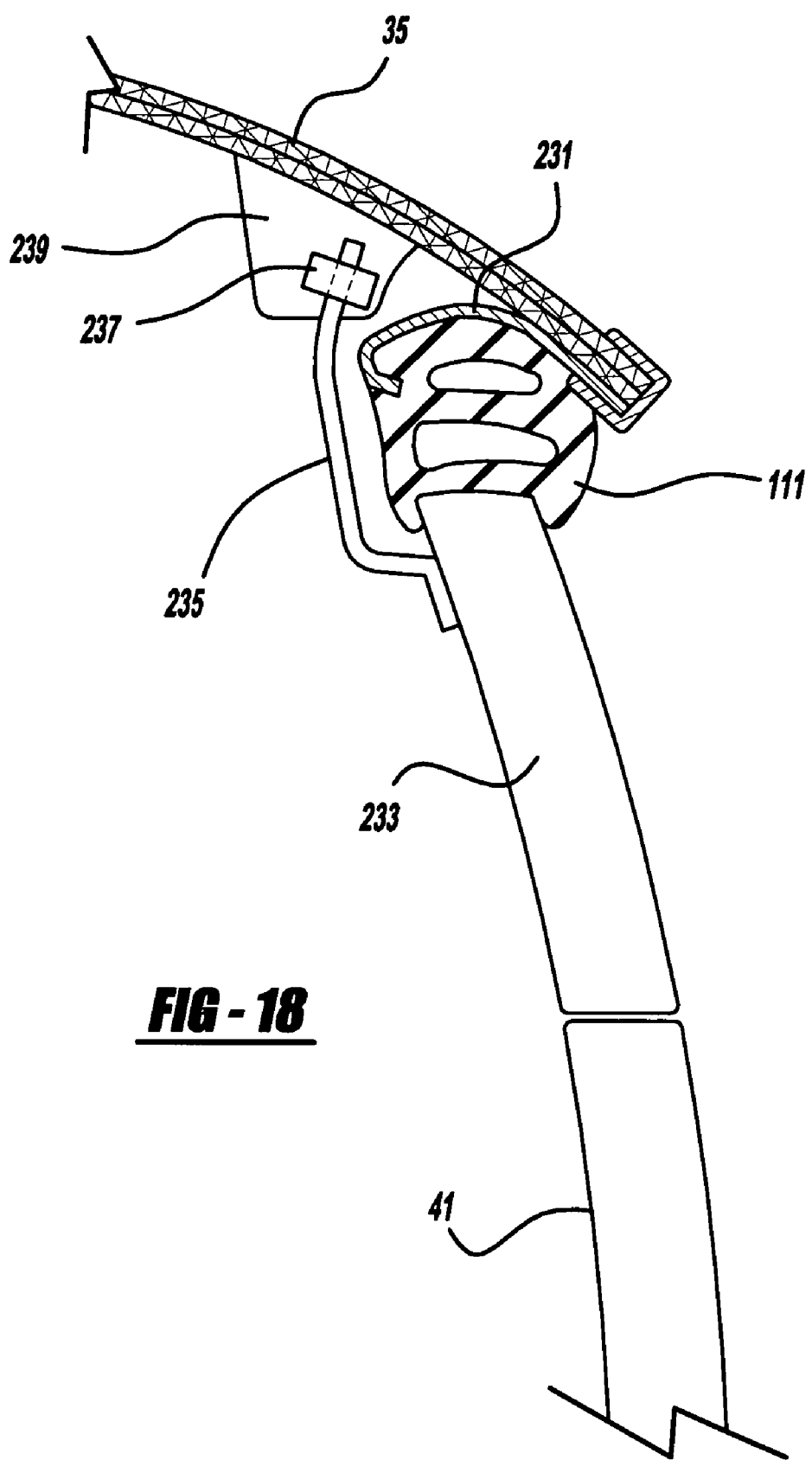
FIG. 18 is a view, like that of FIG. 14, showing a third alternate embodiment retractable pillar, in an extended position.

Next, FIG. 18 shows a third alternate embodiment that can be used with any of the prior embodiments. In this variation, a compressible double bulb weatherstrip is secured to convertible roof 35 by a metal bracket 231. An upper edge of a retractable, upper B-pillar 233 compresses against weatherstrip 111 as shown. Furthermore, an engagement member 235 is mounted to an interior surface of upper B-pillar 233 and a leading end is inserted within an aperture of a receiver 237 which is affixed to a side rail 239. Side rail 239 moves with the convertible roof. Engagement member 235 may be alternately configured with a conical shape with a rounded point upwardly sliding into the receiver.

Figure 19A:
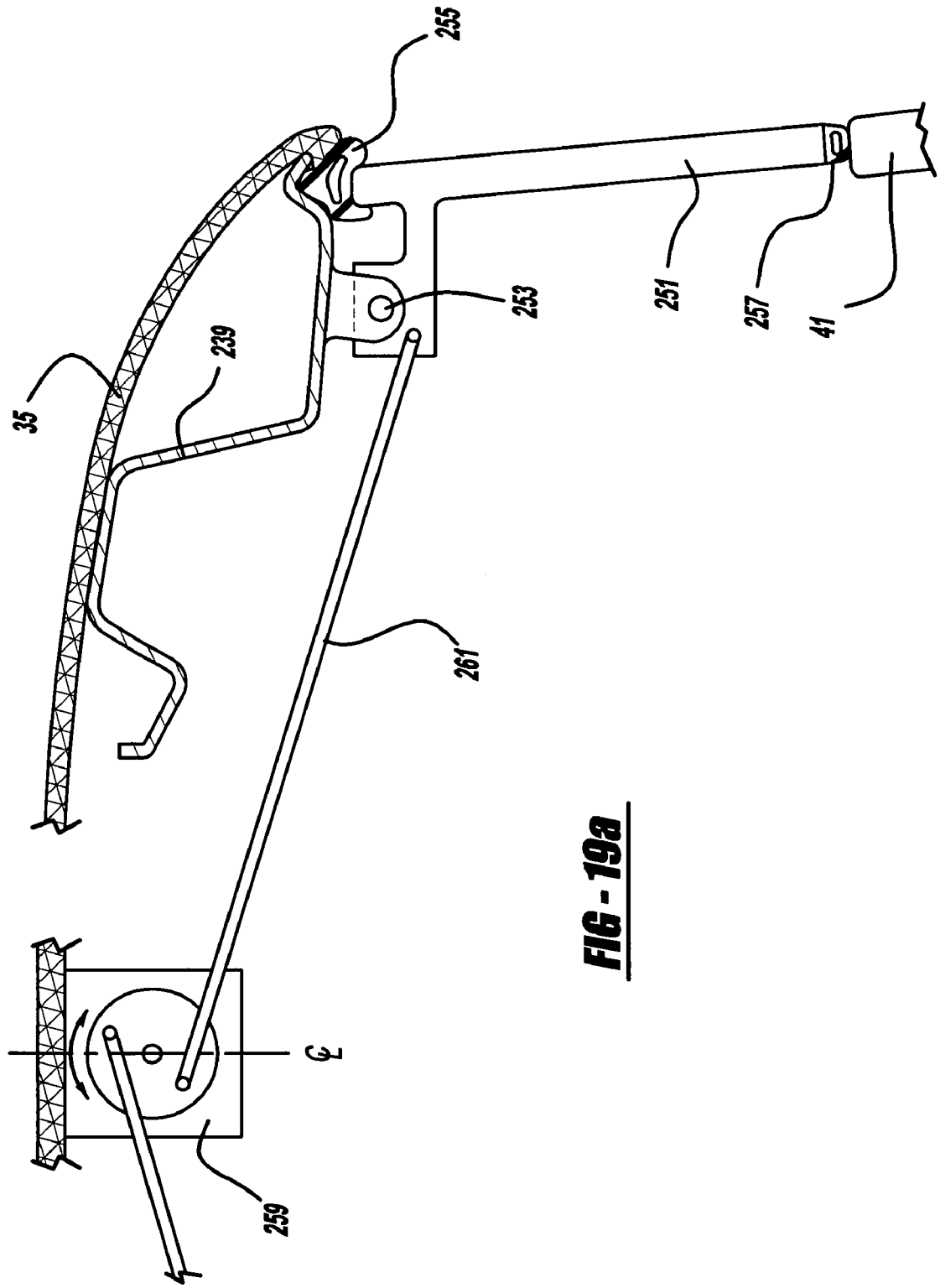
Figure 19C:
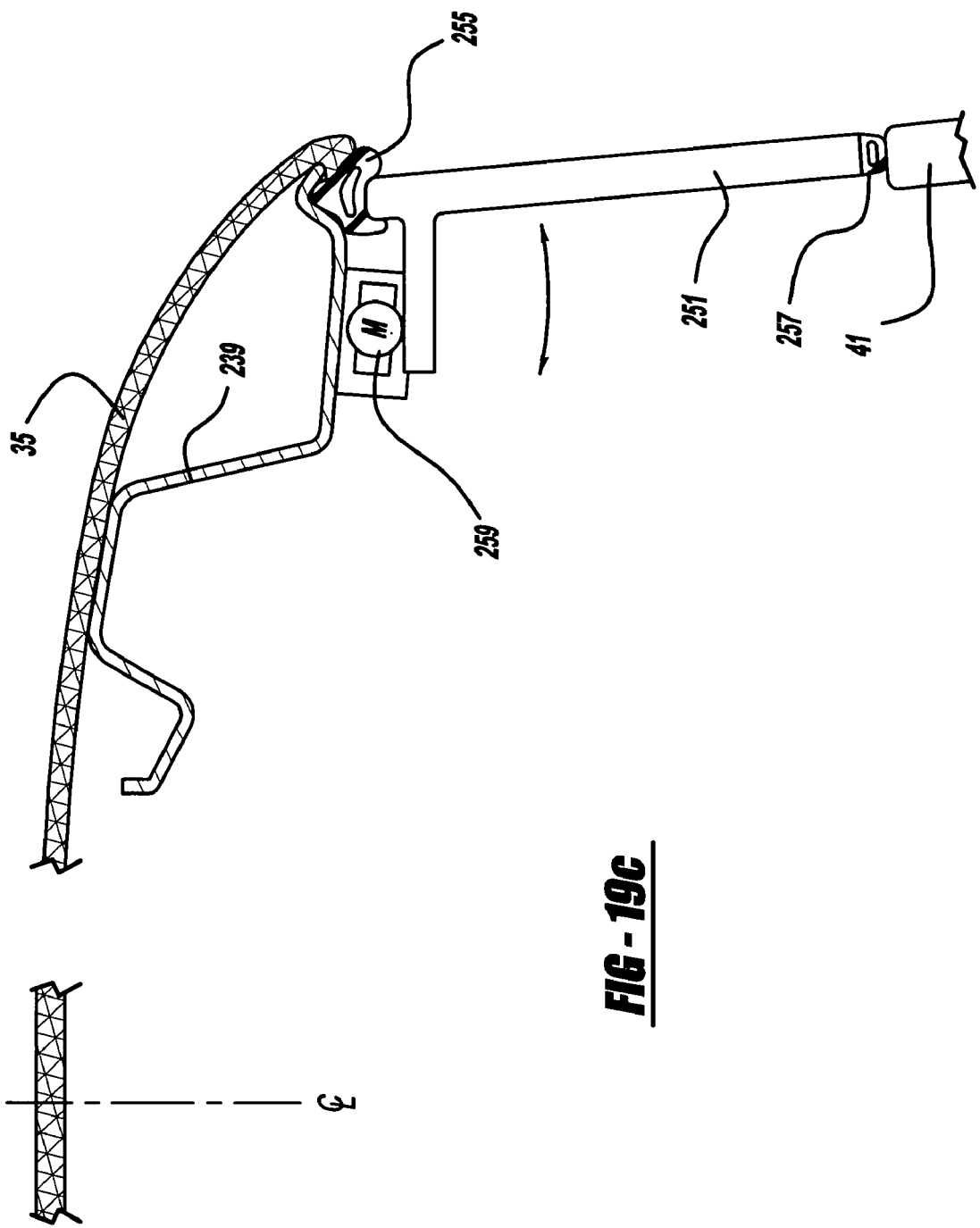

Reference should now be made to FIG. 19. Variations of a fourth alternate embodiment provides a retractable, upper B-pillar 251 that rotates about a pivot 253 mounted on side rail 239 of convertible roof 35. A side rail mounted, single bulb weatherstrip 255 engages an adjacent edge of upper B-pillar 251. Another weatherstrip or wiper seal 257 is mounted on the lower edge of upper B-pillar 251 for engagement with stationary, lower B-pillar 41. In FIG. 19a, an electric motor or other actuator 259 is centrally mounted to convertible roof 35. Actuator 259 operably drives a camming wheel connected to linearly movable cables 261, rod or other linkage members, each of which causes rotational retraction of the upper B-pillar against the convertible roof. Alternately, the camming wheel can be replaced by a motor-driven pulley and rod 261 can be a cable. A Bowden cable 261 transmits rotation of a central motor actuator 259 to an engaging gear 253 coupled to upper B-pillar 251, as illustrated in FIG. 19b. Finally, FIG. 19c provides an electric motor actuator at the side rail 239 which directly drives each upper B-pillar 251.

While various embodiments of the retractable pillar have been disclosed, it should be appreciated that variations thereof are still encompassed within the present invention. For example, the retractable upper B-pillar may include one, two or more stackable segments which fold or telescope relative to each other during extension or retraction. Furthermore, the retractable pillar can be an A, C, D or other pillar although some of the advantages of the present invention may not be achieved. Moreover, rollers may be replaced by cam-following pins, flanges or shoes. Rack and pinion mechanisms, tape drive mechanisms, pulley and cable mechanisms, and Bowden cable mechanisms can be substituted for the disclosed camming or guiding devices. Additionally, the tracks, camming slots or guides, and the followers may be reversed between parts or may be outwardly versus inwardly positioned relative to the pillars, if aesthetics of the exposed pillar surfaces is maintained. All disclosed embodiments of the retractable pillar of the present invention can also be used in a fixed or stationary roof four door sedan or two door coupe vehicle, although various advantages of the convertible vehicle combinations may not be realized. While certain materials, dimensions and manufacturing processes have been disclosed, others may be employed. It is intended by the following claims to cover these and any other departures from the disclosed embodiments which fall within the true spirit of this invention.

The invention claimed is:

1. An automotive vehicular apparatus comprising;
    a side pillar and an automatic actuator operably moving the pillar from an extended position to a retracted position, the automatic actuator operably moving at least part of the pillar in a cross-vehicle direction and below a vehicular beltline when moved between the positions; and
    at least part of the pillar operably moving in the cross-vehicle direction, while maintaining a substantially vertical orientation of the pillar, when the pillar is moved between the extended and retracted positions.

2. The apparatus of claim 1 wherein the pillar is a B-pillar upper, further comprising a stationary B-pillar lower located substantially below the B-pillar upper when the B-pillar upper is located in its extended position.

3. The apparatus of claim 2 further comprising a passenger door pivotably mounted to the B-pillar lower.

4. An automotive vehicular apparatus comprising:
    a side pillar;
    an automatic actuator operably moving the pillar from an extended position to a retracted position, the automatic actuator operably moving at least part of the pillar in a cross-vehicle direction and below a vehicular beltline when moved between the positions;
    at least one front passenger door;
    at least one rear passenger door;
    a first side window mounted to the front door;
    a second side window mounted to the rear door;
    at least one weatherstrip directly mounted to and movable with the pillar, the at least one weatherstrip contacting against the first and second side windows; and
    a convertible roof system including a flexible cover, a linkage mechanism and side rails supporting the cover, wherein the cover, linkage mechanism and side rails are all movable together from a raised position to a lowered position;
    the pillar separating the first and second side windows, when the pillar is in its extended position and the windows are in raised positions, and the pillar contacting against the convertible roof system when the convertible roof system is in its raised position.

5. The apparatus of claim 4 further comprising moving at least part of the pillar in the cross-vehicle direction, while maintaining a substantially vertical orientation of the pillar, when moved between the extended and retracted positions.

6. The apparatus of claim 1 further comprising an elongated guide and a follower engaging and riding along the guide, one of the guide and follower being coupled to and moving with the pillar, and the other of the guide and follower being coupled to a stationary vehicle structure.

7. The apparatus of claim 1 further comprising a cam and a cam follower engaging and riding along the cam, one of the cam and cam follower being coupled to and moving with the pillar, and the other of the cam and cam follower being coupled to a stationary vehicle structure.

8. The apparatus of claim 1 further comprising:
a convertible roof and a second automatic actuator operably folding the convertible roof from a raised position to a lowered position substantially behind the pillar; and
side windows movable mechanically independently of the pillar.

9. The apparatus of claim 1 further comprising a stationary roof located adjacent an end of the pillar when the pillar is in the extended position.

10. The apparatus of claim 4 wherein the pillar is a B-pillar upper, further comprising a stationary B-pillar lower located substantially below the B-pillar upper when the B-pillar upper is located in its extended position.

11. The apparatus of claim 4 further comprising a guide track coupled to the pillar, and automatically moving the pillar in a sliding manner along the guide track between the extended and retracted positions.

12. The apparatus of claim 4 wherein the automatic actuator further comprises a fluid cylinder and rod coupled to and operably extending the pillar.

13. The apparatus of claim 4 wherein the automatic actuator further comprises an electromagnetic actuator coupled to and operably extending the pillar.

14. An automotive vehicle comprising:
a stationary and structural, lower pillar member; and
an upper pillar member including a hollow cross-sectional shape;
the upper pillar member being movable from an extended position substantially above a majority of the pillar lower member to a retracted position withdrawn from the area immediately above the pillar lower member; and
moving at least part of the upper pillar member in a cross-vehicle direction and below a vehicular beltline when moved between the extended and retracted positions.

15. The vehicle of claim 14 further comprising a guide track coupled to at least one of the pillars, and automatically moving the upper pillar member along the guide track in a sliding manner between the extended and retracted positions.

16. An automotive vehicle comprising:
a stationary and structural, lower pillar member; and
an upper pillar member including a hollow cross-sectional shape;
the upper pillar member being movable from an extended position substantially above a majority of the pillar lower member to a retracted position withdrawn from the area immediately above the pillar lower member;
at least one front passenger door engaging the lower pillar member when in at least one operating condition;
at least one rear passenger door engaging the lower pillar member when in at least one operating condition;
a first side window mounted to and movable relative to the front door;
a second side window mounted to and movable relative to the rear door;
at least one weatherstrip directly mounted to and movable with the upper pillar member and contacting against the first and second side windows; and
a convertible roof system including a linkage mechanism and side rails;
wherein the linkage mechanism and side rails are all movable together from a raised position to a lowered position substantially below a vehicular beltline;
the upper pillar member separating the first and second side windows when the upper pillar member is in its extended position and the windows are in raised positions.

17. The vehicle of claim 16 further comprising moving at least part of the upper pillar member in a cross-vehicle direction and below a vehicular beltline when moved between the extended and retracted positions.

18. The vehicle of claim 14 further comprising a microprocessor controller automatically causing the upper pillar member to retract when moved to its retracted position.

19. The vehicle of claim 14 further comprising an automatic actuator retracting the upper pillar member in a downward direction substantially parallel and overlapping with the lower pillar member when moved to its retracted position.

20. An automotive vehicle comprising:
a stationary and structural, lower pillar;
an upper pillar including a substantially flat cross sectional shape with a greater fore-and-aft dimension than a thickness dimension;
an attachment formation mounted on the upper pillar;
the upper pillar being movable from a first position, substantially above a majority of the lower pillar, to a second position;
a camming guide track coupled to the upper pillar;
at least one front passenger door engaging the lower pillar member when in at least one orientation;
at least one rear passenger door engaging the lower pillar member when in at least one orientation;
a first side window mounted to the front door;
a second side window mounted to the rear door; and
a convertible roof system movable from a raised position, covering the upper pillar, to a lowered position rearward of the upper pillar.

21. The vehicle of claim 20 further comprising a controller causing an automatic actuator to automatically move the pillar between the extended and retracted positions.

22. The vehicle of claim 20 further comprising:
at least one weatherstrip directly mounted to the upper pillar and contacting against the first and second side windows.

23. A device for use with an automotive vehicle, the device comprising a side pillar and an actuator operably moving the pillar in a cross-vehicle direction between raised and lowered positions while maintaining a substantially vertical orientation of the pillar, the pillar being externally visible from outside the vehicle when in the raised orientation.

24. The device of claim 23 wherein the pillar is an upper B-pillar, further comprising a stationary and lower B-pillar located substantially below the upper B-pillar when the upper B-pillar located in its functional orientation.

25. The device of claim 24 further comprising a passenger door pivotably mounted to the lower B-pillar, and a microprocessor controller connected to the actuator.

26. The device of claim 23 further comprising a cam coupled to the pillar.

27. The device of claim 23 further comprising a guide track coupled to the pillar for sliding movement.

28. The device of claim 23 further comprising:
a first side window;
a second side window;

at least one weatherstrip directly mounted to and movable with the pillar contacting against the first and second side windows; and a convertible roof system being movable from a raised position to a lowered position behind the pillar.

29. The device of claim 23 further comprising a weatherstrip molded onto the pillar.

30. The system of claim 29 wherein the weatherstrip comprises a metallic insert and a flexible portion, the flexible portion is one of: PVC and RIM, insert molded to encapsulate a flange of the pillar.

31. The system of claim 29 further comprising a movable side window, the weatherstrip contacting against the side window.

32. The system of claim 23 further comprising:

a convertible roof movable from a raised position, above the pillar, to a lowered position rear of a passenger compartment.

33. A vehicular system comprising:

a pillar segment movable between an extended position and a retracted position, the pillar segment being located rearward of a windshield;

a convertible roof movable from a raised position above the pillar segment to a lowered position rear of a passenger compartment, the convertible roof including side rails that move with the convertible roof between the raised and lowered positions;

an automatic actuator operably driving the pillar segment between the extended and retracted positions;

a microprocessor controller operably energizing the actuator; and an elongated camming member coupled to the pillar segment;

wherein the pillar segment is located between front and rear passenger door openings.

34. The system of claim 33 wherein the convertible roof includes a hard-top roof section.

35. The system of claim 33 wherein the convertible roof includes a soft-top roof section.

36. The system of claim 33 further comprising a weatherstrip directly attached to and moving with the pillar segment.

37. The system of claim 33 wherein the pillar segment moves in a substantially cross-vehicle direction when moving between its positions.

38. The system of claim 33 wherein the pillar segment has a substantially vertical orientation when moving between its positions.

39. The system of claim 33 wherein the pillar segment has a hollow section.

40. The system of claim 33 further comprising a stationary lower pillar and a seal located between the pillar segment and the lower pillar when the pillar segment is in its extended position.

* * * * *